(12) United States Patent
Kraeling et al.

(10) Patent No.: US 8,798,821 B2
(45) Date of Patent: Aug. 5, 2014

(54) SYSTEM AND METHOD FOR COMMUNICATING DATA IN A LOCOMOTIVE CONSIST OR OTHER VEHICLE CONSIST

(75) Inventors: Mark Bradshaw Kraeling, Melbourne, FL (US); Jared Cooper, Melbourne, FL (US); Todd Goodermuth, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 13/189,944

(22) Filed: Jul. 25, 2011

(65) Prior Publication Data
US 2011/0282525 A1 Nov. 17, 2011

Related U.S. Application Data

(63) Continuation-in-part of application No. 12/683,874, filed on Jan. 7, 2010, now Pat. No. 8,532,850.

(60) Provisional application No. 61/160,930, filed on Mar. 17, 2009, provisional application No. 61/382,765, filed on Sep. 14, 2010.

(51) Int. Cl.
*G06F 17/00* (2006.01)
(52) U.S. Cl.
USPC .............................. 701/19; 375/220
(58) Field of Classification Search
USPC .......... 701/19; 104/307; 105/26.05; 375/219, 375/220, 258; 246/167 R; 180/14.1
See application file for complete search history.

(56) References Cited

U.S. PATENT DOCUMENTS

| | | | |
|---|---|---|---|
| 1,517,549 A | 12/1924 | Espenschied |
| 3,675,196 A | 7/1972 | Molloy |
| 3,694,751 A | 9/1972 | Takahashi |

(Continued)

FOREIGN PATENT DOCUMENTS

| | | | |
|---|---|---|---|
| DE | 102005057273 A1 | 5/2007 |
| EP | 0829415 A1 | 3/1998 |

(Continued)

OTHER PUBLICATIONS

Search Report and Written Opinion for corresponding PCT Application No. PCT/US2010/053471, dated Jan. 21, 2011.

(Continued)

*Primary Examiner* — Russell Frejd
(74) *Attorney, Agent, or Firm* — GE Global Patent Operation; John A. Kramer

(57) ABSTRACT

A communication system for a vehicle consist includes a control module that interfaces with at least one of a first router transceiver pair or a redundant router transceiver pair. Each of the router transceiver pairs can communicate network data between vehicles of the consist over a cable bus of the vehicle consist. The control module includes a monitor module and a switch module. The monitor module monitors operation of at least one of the first router transceiver pair or the redundant router transceiver pair. The switch module is operably coupled with the monitor module and controls the first router transceiver pair or the redundant router transceiver pair to communicate the network data over the cable bus if the other of the first router transceiver pair or the redundant router transceiver pair enters a failure condition for being unable to communicate the network data over the cable bus.

29 Claims, 16 Drawing Sheets

(56) References Cited

U.S. PATENT DOCUMENTS

| | | |
|---|---|---|
| 3,714,419 A | 1/1973 | Fosse |
| 3,715,669 A | 2/1973 | LaForest |
| 3,745,933 A | 7/1973 | Eisele et al. |
| 3,750,020 A | 7/1973 | Baba |
| 3,754,209 A | 8/1973 | Molloy |
| 3,815,085 A | 6/1974 | Leclercq |
| 3,835,950 A | 9/1974 | Asano |
| 3,891,965 A | 6/1975 | Schroeder |
| 3,938,129 A | 2/1976 | Smither |
| 3,949,959 A | 4/1976 | Rhoton |
| 4,074,879 A | 2/1978 | Clark |
| 4,207,569 A | 6/1980 | Meyer |
| 4,344,364 A | 8/1982 | Nickles et al. |
| 4,369,942 A | 1/1983 | Wilson |
| 4,420,133 A | 12/1983 | Dietrich |
| 4,442,988 A | 4/1984 | Laurent |
| 4,491,967 A | 1/1985 | Kobayashi |
| 4,498,650 A | 2/1985 | Smith |
| 4,645,148 A | 2/1987 | Kolkman |
| 4,655,421 A | 4/1987 | Jaeger |
| 4,735,385 A | 4/1988 | Nickles et al. |
| 4,910,793 A | 3/1990 | Mainardi |
| 5,019,815 A | 5/1991 | Lemelson |
| 5,056,873 A | 10/1991 | Deno |
| 5,132,682 A | 7/1992 | Higgins |
| 5,208,584 A | 5/1993 | Kaye |
| 5,248,967 A | 9/1993 | Daneshfar |
| 5,289,378 A | 2/1994 | Miller et al. |
| 5,293,632 A | 3/1994 | Novakovich et al. |
| 5,309,155 A | 5/1994 | Hsien |
| 5,317,751 A | 5/1994 | Novakovich et al. |
| 5,330,134 A | 7/1994 | Ehrlich |
| 5,339,782 A | 8/1994 | Golzer |
| 5,342,120 A | 8/1994 | Zimmer |
| 5,353,413 A | 10/1994 | Novakovich et al. |
| 5,491,463 A | 2/1996 | Sargeant |
| 5,507,456 A | 4/1996 | Brown |
| 5,530,328 A | 6/1996 | Fernandez et al. |
| 5,548,815 A | 8/1996 | Takayama |
| 5,581,472 A | 12/1996 | Miller et al. |
| 5,630,565 A | 5/1997 | Lumbis |
| 5,633,629 A | 5/1997 | Hochstein |
| 5,636,907 A | 6/1997 | Okazaki |
| 5,681,015 A | 10/1997 | Kull |
| 5,749,547 A | 5/1998 | Young |
| 5,787,371 A | 7/1998 | Balukin et al. |
| 5,859,584 A | 1/1999 | Counsell |
| 5,867,404 A | 2/1999 | Bryan |
| 5,870,016 A | 2/1999 | Shrestha |
| 5,901,683 A | 5/1999 | Patel |
| 5,928,294 A | 7/1999 | Zelinkovsky |
| 5,950,966 A | 9/1999 | Hungate |
| 6,032,905 A | 3/2000 | Haynie |
| 6,102,340 A | 8/2000 | Peek |
| 6,163,089 A | 12/2000 | Kull |
| 6,203,343 B1 | 3/2001 | Chevassus-More et al. |
| 6,216,985 B1 | 4/2001 | Stephens |
| 6,217,126 B1 | 4/2001 | Kull |
| 6,225,919 B1 | 5/2001 | Lumbis et al. |
| 6,229,452 B1 | 5/2001 | Kull |
| 6,283,765 B1 | 9/2001 | Lumbis et al. |
| 6,313,589 B1 | 11/2001 | Kobayashi |
| 6,317,031 B1 | 11/2001 | Rickard |
| 6,324,659 B1 | 11/2001 | Pierro |
| 6,330,499 B1 | 12/2001 | Chou et al. |
| 6,384,735 B1 | 5/2002 | Rabou |
| 6,400,281 B1 | 6/2002 | Darby, Jr. |
| 6,401,015 B1 | 6/2002 | Stewart |
| 6,435,624 B1 | 8/2002 | Kull et al. |
| 6,445,150 B1 | 9/2002 | Tanner |
| 6,452,482 B1 | 9/2002 | Cern |
| 6,456,908 B1 | 9/2002 | Kumar |
| 6,463,367 B2 | 10/2002 | Neff |
| 6,487,478 B1 | 11/2002 | Azzaro |
| 6,504,485 B2 | 1/2003 | Jinno |
| 6,574,748 B1 | 6/2003 | Andress |
| 6,582,031 B2 | 6/2003 | Newton et al. |
| 6,688,561 B2 | 2/2004 | Mollet |
| 6,759,871 B2 | 7/2004 | Nguyen et al. |
| 6,830,224 B2 | 12/2004 | Lewin |
| 6,839,664 B1 | 1/2005 | Kull |
| 6,856,865 B2 | 2/2005 | Hawthorne |
| 6,862,502 B2 | 3/2005 | Peltz |
| 6,885,854 B2 | 4/2005 | Stewart |
| 6,977,578 B2 | 12/2005 | Kline |
| 6,980,127 B2 | 12/2005 | Lumbis et al. |
| 7,004,550 B2 | 2/2006 | Root et al. |
| 7,006,012 B2 | 2/2006 | Taoka |
| 7,021,588 B2 | 4/2006 | Hess et al. |
| 7,029,076 B2 | 4/2006 | Root et al. |
| 7,038,597 B2 | 5/2006 | Smith |
| 7,042,351 B2 | 5/2006 | Kline |
| 7,062,381 B1 | 6/2006 | Rekow |
| 7,069,123 B2 | 6/2006 | Lapointe |
| 7,072,408 B2 | 7/2006 | Gehlot |
| 7,072,747 B2 | 7/2006 | Armbruster |
| 7,075,414 B2 | 7/2006 | Giannini |
| 7,076,343 B2 | 7/2006 | Kornick |
| 7,079,926 B2 | 7/2006 | Kane |
| 7,140,577 B2 | 11/2006 | Mollet |
| 7,143,017 B2 | 11/2006 | Flynn |
| 7,162,337 B2 | 1/2007 | Peltz |
| 7,164,368 B1 | 1/2007 | Ireland |
| 7,222,003 B2 | 5/2007 | Stull |
| 7,236,765 B2 | 6/2007 | Bonicatto |
| 7,257,471 B2 | 8/2007 | Kornick |
| 7,264,208 B2 | 9/2007 | Kovach |
| 7,302,895 B2 | 12/2007 | Kumar |
| 7,333,027 B2 | 2/2008 | Bourgault |
| 7,336,156 B2 | 2/2008 | Arita |
| 7,356,389 B2 | 4/2008 | Holst |
| 7,467,032 B2 | 12/2008 | Kane |
| 7,494,194 B2 | 2/2009 | Higgs et al. |
| 7,532,604 B2 | 5/2009 | Eglin |
| 7,618,011 B2 | 11/2009 | Oleski et al. |
| 7,653,465 B1 | 1/2010 | Geiger |
| 7,664,459 B2 | 2/2010 | Smith, Jr. |
| 7,667,344 B2 | 2/2010 | Zitting |
| 7,673,568 B2 | 3/2010 | Marra et al. |
| 7,688,218 B2 | 3/2010 | Lefebvre |
| 7,725,252 B2 | 5/2010 | Heddebaut |
| 7,948,398 B2 | 5/2011 | Miller |
| 7,994,937 B2 | 8/2011 | Hsu |
| 8,504,218 B2 | 8/2013 | Mollet |
| 8,589,003 B2 * | 11/2013 | Brand et al. .................... 701/20 |
| 2001/0044681 A1 | 11/2001 | Diana et al. |
| 2001/0044695 A1 | 11/2001 | Doner |
| 2002/0087578 A1 | 7/2002 | Vroman |
| 2002/0186670 A1 | 12/2002 | Fuster et al. |
| 2003/0009274 A1 | 1/2003 | Peterson et al. |
| 2003/0021441 A1 | 1/2003 | Levy |
| 2003/0034423 A1 | 2/2003 | Hess et al. |
| 2003/0087543 A1 | 5/2003 | Hess et al. |
| 2003/0094545 A1 | 5/2003 | Smith |
| 2003/0137191 A1 | 7/2003 | Smith |
| 2003/0151520 A1 | 8/2003 | Kraeling et al. |
| 2003/0210671 A1 | 11/2003 | Eglin |
| 2003/0213875 A1 | 11/2003 | Hess et al. |
| 2003/0223387 A1 | 12/2003 | Davenport |
| 2004/0084957 A1 | 5/2004 | Root et al. |
| 2004/0104312 A1 | 6/2004 | Hess et al. |
| 2005/0076716 A1 | 4/2005 | Turner |
| 2005/0125112 A1 | 6/2005 | LaDuc |
| 2005/0125113 A1 | 6/2005 | Wheeler |
| 2005/0143868 A1 | 6/2005 | Whelan |
| 2005/0143874 A1 | 6/2005 | Peltz |
| 2005/0160169 A1 | 7/2005 | Segal |
| 2005/0189815 A1 | 9/2005 | Bryant |
| 2005/0197748 A1 | 9/2005 | Holst |
| 2005/0228552 A1 | 10/2005 | Kornick |
| 2005/0254818 A1 | 11/2005 | Zhou et al. |
| 2006/0025903 A1 | 2/2006 | Kumar |
| 2006/0085103 A1 | 4/2006 | Smith et al. |
| 2006/0138285 A1 | 6/2006 | Oleski et al. |

(56) References Cited

U.S. PATENT DOCUMENTS

| | | |
|---|---|---|
| 2006/0170285 A1 | 8/2006 | Morimitsu |
| 2006/0180709 A1 | 8/2006 | Breton et al. |
| 2007/0061056 A1 | 3/2007 | Valsorda |
| 2007/0173989 A1 | 7/2007 | Walker |
| 2007/0228813 A1 | 10/2007 | Smith |
| 2007/0236079 A1 | 10/2007 | Kull |
| 2007/0241610 A1 | 10/2007 | Smith |
| 2008/0033605 A1 | 2/2008 | Daum |
| 2008/0087772 A1 | 4/2008 | Smith |
| 2008/0112473 A1 | 5/2008 | Refaeli et al. |
| 2008/0159281 A1 | 7/2008 | Jesseph |
| 2008/0173770 A1 | 7/2008 | Ruggiero |
| 2008/0195265 A1 | 8/2008 | Searle |
| 2009/0037038 A1 | 2/2009 | Mollet |
| 2009/0079560 A1 | 3/2009 | Fries |
| 2009/0158360 A1 | 6/2009 | Diab et al. |
| 2009/0223760 A1 | 9/2009 | Smith |
| 2010/0034298 A1 | 2/2010 | Takahashi et al. |
| 2010/0049384 A1 | 2/2010 | Kraeling |
| 2010/0049830 A1 | 2/2010 | Chenu |
| 2010/0118988 A1 | 5/2010 | Smith |
| 2010/0130124 A1 | 5/2010 | Teeter |
| 2010/0171609 A1 | 7/2010 | Yeldell |
| 2010/0185472 A1 | 7/2010 | Goodermuth |
| 2010/0241295 A1 | 9/2010 | Cooper |
| 2010/0332058 A1 | 12/2010 | Kane |
| 2011/0099413 A1* | 4/2011 | Cooper et al. ................. 714/4.1 |
| 2011/0270475 A1 | 11/2011 | Brand |
| 2011/0284700 A1 | 11/2011 | Brand |
| 2012/0074266 A1 | 3/2012 | Daum |
| 2012/0078452 A1 | 3/2012 | Daum |
| 2012/0078453 A1 | 3/2012 | Daum |

FOREIGN PATENT DOCUMENTS

| | | |
|---|---|---|
| EP | 1065128 A1 | 1/2001 |
| EP | 1601136 A1 | 11/2005 |
| EP | 1693272 A1 | 8/2006 |
| EP | 1719688 A1 | 11/2006 |
| EP | 1886893 A1 | 2/2008 |
| EP | 1897781 A2 | 3/2008 |
| KR | 20110039071 A | 4/2011 |
| WO | 9842096 A2 | 9/1998 |
| WO | 0171942 A2 | 9/2001 |
| WO | 0222425 A1 | 3/2002 |
| WO | 0223503 A1 | 3/2002 |
| WO | 03098861 A1 | 11/2003 |
| WO | 2005102018 A2 | 11/2005 |
| WO | 2006075767 A2 | 7/2006 |
| WO | 2006134434 A1 | 12/2006 |
| WO | 2007095401 A2 | 8/2007 |
| WO | 2007121043 A1 | 10/2007 |
| WO | 2010059312 A1 | 5/2010 |
| WO | 2011042943 A1 | 4/2011 |

OTHER PUBLICATIONS

Search Report and Written Opinion from corresponding PCT Application No. PCT/US2011/055013, dated Apr. 10, 2012.

Hoerl, F. et al., "Multiple Radio Remote Control of Locomotives in Coupled Trains/Telecommande Multiple Par Radio D'Enains Dens Le Train", vol. 100, No. 3, pp. 105-109, Mar. 1, 2002.

Search Report and Written Opinion from corresponding PCT Application No. PCT/US2012/042675, dated Aug. 10, 2012.

Search Report and Written Opinion from corresponding PCT Application No. PCT/US2012/041858, dated Nov. 30, 2012.

Search Report and Written Opinion from corresponding PCT Application No. PCT/US2011/36159, dated Aug. 30, 2011.

Search Report and Written Opinion from corresponding PCT Application No. PCT/US2011/42476, dated Aug. 31, 2011.

Search Report and Written Opinion for corresponding PCT Application No. PCT/US2011/051536, dated Jan. 24, 2012.

Prof. Dr. Hubert Kirrmann (Jan. 20, 1999). "Train Communication Network IEC 61375—4 Wire Train Bus" (powerpoint), Ecole Polytechnique Federale de Lausanne (EPFL).

Prof. Dr. Hubert Kirrmann (Jan. 20, 1999). "train Communication Network IEC 61375—3 Multifunction Vehicle Bus" (powerpoint). Ecole Polytechnique Federale de Lausanne (EPFL).

Informations—und Steuerungstechnik auf Schienenfahrzeugen—Bussysteme im Zug. Elektronik industrie Aug. 9, 2008 (in de). InnoTrans Special: Bahnelektronik. Sep. 14, 2008.

"The IEC/IEEE/UIC Train Communication Network for time-critical and safe on-board communication" (powerpoint). Bombardier Transportation. Jun. 10, 2002.

Hubert Kirrmann (ABB Corporate Research); Pierre A. Zuber (DaimlerChrysler Rail Systems). "The IEC/IEEE Train Communication Network" (PDF). IEEE Micro. Mar.-Apr. 2001: 81-92. 0272-1732/01.

* cited by examiner

SYSTEM AND METHOD FOR COMMUNICATING DATA IN A LOCOMOTIVE CONSIST OR OTHER VEHICLE CONSIST

CROSS-REFERENCE TO RELATED APPLICATIONS

This application is a continuation-in-part of U.S. patent application Ser. No. 12/683,874 (now U.S. Pat. No. 8,532, 850), which is entitled "System And Method For Communicating Data In Locomotive Consist Or Other Vehicle Consist" and was filed on Jan. 7, 2010 (the "'874 Application"), which claims priority to U.S. Provisional Application Ser. No. 61/160,930, which was filed on Mar. 17, 2009 (the "'930 Application"). This application also claims priority to Provisional Application Ser. No. 61/382,765, which is entitled "System And Method For Communicating Data In Locomotive Consist Or Other Vehicle Consist" and was filed on Sep. 14, 2010 (the "'765 Application"). The entire disclosures of the above patent applications (e.g. the '874 Application, the '930 Application, and the '765 Application) are incorporated by reference herein in their entirety.

FIELD OF THE INVENTION

Embodiments of the invention relate to data communications. Other embodiments relate to data communications in a locomotive consist or other vehicle consists.

BACKGROUND OF THE INVENTION

A locomotive "consist" is a group of two or more locomotives that are mechanically coupled or linked together to travel along a route. Trains may have one or more locomotive consists. Locomotives in a consist include a lead locomotive and one or more trail locomotives. A train will have at least one lead consist, and may also have one or more remote consists positioned further back in the train.

In a locomotive consist, each locomotive includes a connection at each end of the locomotive to couple the power and brake systems of the locomotive to adjacent locomotives such that they function together as a single unit. Each locomotive is connected to subsequent locomotives via a port and jumper cable that includes twenty seven pins on each end. This cable is commonly referred to in the industry as a multiple unit cable or "MU" cable. Two or more of the locomotives in a consist may each include an on-board controller or other electronics. In certain cases, it may be desirable to link the on-board electronics together as a computer network, such that electronics of the lead locomotive in the consist can communicate with electronics of the trail locomotives. This intra-consist network may allow for inherent redundancies in locomotive electronics to be used to improve reliability of locomotives by allowing lead locomotives to utilize electronic equipment contained in trail locomotives of the same consist. It may be easier and more cost effective to use remote electronics in a trail locomotive than providing redundant equipment on each locomotive.

Heretofore, communications in a locomotive consist have been realized using two methods. The first involves wireless communications between the vehicles in the consist using radio equipment. Wireless communications, however, are costly to implement, and are particularly prone to cross talk between connected locomotives and locomotives not physically connected on adjacent tracks. The second method involves miming dedicated network cables between the linked locomotives in a consist. However, in most cases this requires retrofitting existing vehicles with additional cables, which is oftentimes cost prohibitive. Additionally, since the cabling is exposed in the separation space between adjacent linked locomotives, the cabling may be prone to failure if the vehicle consist is operated in harsh environmental conditions, e.g., bad weather. Finally, there is additional labor required to connect locomotives with dedicated network cables, and this will require additional training.

BRIEF DESCRIPTION OF THE INVENTION

Embodiments of the present invention relate to a system and method for communicating data in a vehicle consist. "Vehicle consist" refers to a group of vehicles that are mechanically coupled or linked together to travel together. In one embodiment, the vehicle consist is a locomotive consist that includes a group of locomotives linked together to travel along a set of one or more rails. In one embodiment of the method, network data is transmitted between a lead locomotive in the locomotive consist and one or more trail locomotives in the locomotive consist. "Network data" refers to data that is packaged in packet form as data packets. Each data packet includes the network address of a recipient computer unit or other electronic component. The network data is transmitted over an existing locomotive multiple unit (MU) cable bus that interconnects the lead locomotive and the trail locomotives. The MU cable bus is an existing electrical bus that is used in the locomotive consist for transferring non-network control information between the lead locomotive and the trail locomotives. (MU "cable bus" refers to the MU cable jumper that actually interconnects adjacent locomotives and/or to the internal electrical system that connects the cable jumper to internal locomotive electronics and the MU ports on either end of a locomotive.) "Non-network" control information refers to command information, used in the locomotive consist for locomotive control purposes, which is not packet data. In another embodiment, non-network control information is not packet data, and does not include recipient network addresses.

In one embodiment, a communication system for a vehicle consist is provided. The system includes a control module that is configured to interface with at least one of a first router transceiver pair or a redundant router transceiver pair. Each of the router transceiver pairs is configured to communicate network data between vehicles of the consist over a cable bus of the vehicle consist. The control module includes a monitor module and a switch module. The monitor module monitors operation of at least one of the first router transceiver pair or the redundant router transceiver pair. The switch module is operably coupled with the monitor module and is configured to control the first router transceiver pair or the redundant router transceiver pair to communicate the network data over the cable bus if the other of the first router transceiver pair or the redundant router transceiver pair enters a failure condition for being unable to communicate the network data over the cable bus, as determined by the monitor module.

In another embodiment, a communication method includes monitoring a first router transceiver pair and a redundant router transceiver pair. The first router transceiver pair includes a first router transceiver unit disposed on a first vehicle of a vehicle consist and a second router transceiver unit disposed on a different, second vehicle of the vehicle consist. The second router transceiver pair includes a third router transceiver unit disposed on the first vehicle and a fourth router transceiver unit disposed on the second vehicle. The first router transceiver pair and the second router transceiver pair are configured to communicate network data over a cable bus that extends through the vehicle consist. The method also includes determining that one of the first router transceiver pair or the redundant router transceiver pair has entered a failure condition for being unable to communicate the network data over the cable bus and subsequent said determination, controlling the other of the first router transceiver pair or the redundant router transceiver pair to communicate the network data over the cable bus.

In another embodiment, another communication system is provided. The system includes a first router transceiver unit and a redundant router transceiver unit. Each of the first router transceiver unit and the redundant router transceiver unit is configured to be coupled to a cable bus of a vehicle for communicating network data over the cable bus. Each of the first router transceiver unit and the redundant router transceiver unit is configured for one of the first router transceiver unit or the redundant router transceiver unit to communicate the network data over the cable bus if the other of the first router transceiver unit or the redundant router transceiver unit enters a failure condition for being unable to communicate the network data over the cable bus.

In another embodiment, another communication system is provided. The system includes a first router transceiver unit that is configured to be coupled to a cable bus of a first vehicle for communicating network data over the cable bus. The cable bus is configured to interconnect the first vehicle with an adjacent second vehicle when the first vehicle and the second vehicle are assembled together in a vehicle consist. The first router transceiver unit is configured to switch to a redundant router transceiver unit on the first vehicle, for the redundant router transceiver unit to communicate the network data over the cable bus, when the first router transceiver unit enters a failure condition for being unable to communicate the network data over the cable bus.

In another embodiment, the network data is converted at one of the locomotives into modulated network data for transmission over the MU cable bus. The modulated network data is orthogonal to the non-network control information transferred between the lead and trail locomotives over the MU cable bus. "Orthogonal" means that the modulated network data does not interfere with the non-network control information, and that the non-network control information does not interfere with the modulated network data. At another locomotive in the consist (e.g., a recipient locomotive), the modulated network data is received over the MU cable bus and de-modulated for use by a computer unit or other electronic component in the locomotive.

Another embodiment relates to a communication system for communicating data in a locomotive consist. The system comprises respective router transceiver units positioned in the lead locomotive and each of the trail locomotives in the locomotive consist. The router transceiver units are each electrically coupled to an MU cable bus in the locomotive consist that interconnects the lead locomotive and the trail locomotives. The MU cable bus is an existing cable bus that is used in the locomotive consist for transferring non-network control information between the lead and trail locomotives. The router transceiver units are configured to transmit and/or receive network data over the MU cable bus.

In another embodiment of the communication system, each router transceiver unit is configured to convert the network data into modulated network data for transmission over the MU cable bus, and to de-modulate modulated network data received over the MU cable bus back into network data, for use in communicating data between electronic components in the locomotive consist or otherwise. The modulated network data is orthogonal to the non-network control information transferred between the lead and trail locomotives over the MU cable bus.

In another embodiment, in a locomotive equipped with the communication system, the communication system further comprises at least one cable run connecting the router transceiver unit to the MU cable bus. "Cable run" means a length of electrical cabling or other electrical conductor, which may include one discreet electrical pathway or a plurality of discreet electrical pathways (e.g., a bundled cable). The cable run bypasses a portion of the MU cable bus within the locomotive, so that network data travels over less of the MU cable bus than it would without the cable run in place. Thus, in one aspect of the invention, the cable run is installed in a locomotive, around and bypassing at least part of the MU cable bus, to provide a cleaner and less interference prone signal pathway for the communication system, relative to levels of interference that are present if the bypassed portion of the MU cable bus was not bypassed. This may be useful for older locomotives where the MU cable bus is prone to interference, and/or for improving data throughput levels between a consist of three, four, or more locomotives.

In any of the aforementioned embodiments, the network data may be TCP/IP-formatted data; other communications protocols may be used. Additionally, each locomotive may include computer units or other electronic components communicating with other electronic components in the same consist by transmitting the network data, formatted as TCP/IP data or otherwise, over the MU cable bus, thereby forming a computer network, e.g., an Ethernet-type network.

Any of the aforementioned embodiments are also applicable for communicating data in vehicle consists generally. "Vehicle consist" refers to a group of vehicles that are mechanically coupled or linked together to travel along a route.

In any of the embodiments set forth herein, data transmitted over the MU cable bus may be used for locomotive or other vehicle control, such as controlling the locomotive or other vehicle for movement along a route.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
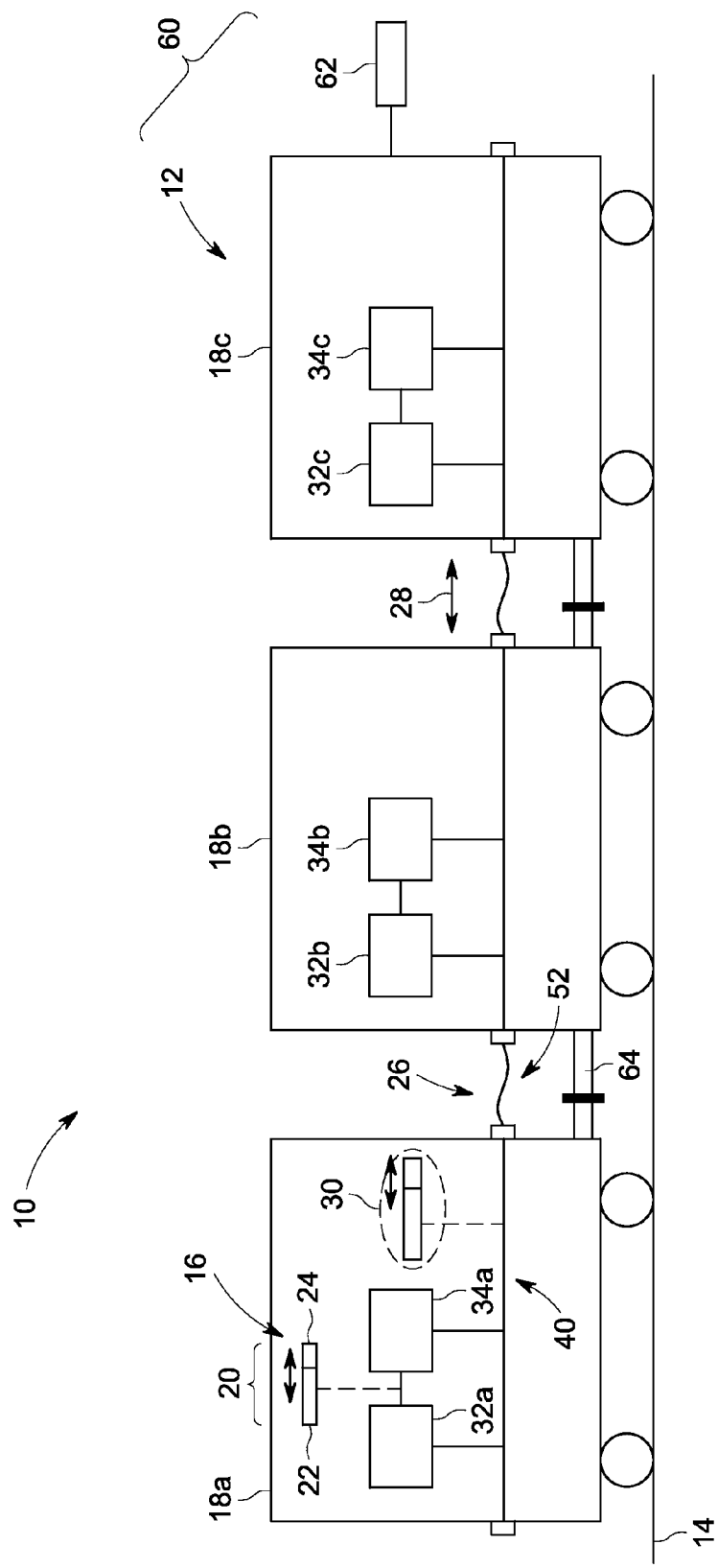
FIG. 1 is a schematic diagram of a communication system for communicating data in a vehicle consist, according to an embodiment of the present invention.

With reference to FIG. 1, embodiments of the present invention relate to a communication system 10 and method for communicating data in a vehicle consist 12. "Vehicle consist" refers to a group of vehicles that are mechanically coupled or linked together to travel. In one embodiment, the vehicle consist 12 is a rail vehicle consist that includes a group of locomotives that are mechanically coupled or linked together to travel along a railway 14. In the system 10, network data 16 is transmitted from one vehicle 18a in the consist 12 (e.g., a lead locomotive 18a) to another vehicle 18b in the consist (e.g., a trail locomotive 18b). Each vehicle 18a-18c is adjacent to and mechanically coupled with another vehicle in the consist 12 such that all vehicles in the consist are connected. "Network data" 16 refers to data that is packaged in packet form, meaning a data packet that comprises a set of associated data bits 20. (Each data packet may include a data field 22 and a network address or other address 24 uniquely associated with a computer unit or other electronic component in the consist 12.) The network data 16 is transmitted over a multiple unit (MU) cable bus 26. The MU cable bus 26 is an existing electrical bus interconnecting the lead vehicle 18a and the trail vehicles 18b, 18c in the consist. The MU cable bus 26 is used in the vehicle consist 12 for transferring non-network control information 28 between vehicles in the consist. "Non-network" control information 28 refers to data or other information, used in the vehicle consist for control purposes, which is not packet data. In another aspect, non-network control information 28 is not packet data, and does not include recipient network addresses.

In another embodiment, as discussed in more detail below, the network data 16 is converted into modulated network data 30 for transmission over the MU cable bus 26. The modulated network data 30 is orthogonal to the non-network control information 28 transferred between vehicles over the MU cable bus 26, to avoid interference. At recipient/subsequent vehicles, the modulated network data 30 is received over the MU cable bus 26 and de-modulated for use by a vehicle electronic component 32a, 32b, 32c. For these functions, the communication system 10 may comprise respective router transceiver units 34a, 34b, 34c positioned in the lead vehicle 18a and each of the trail vehicles 18b, 18c in the vehicle consist 12.

By using an existing inter-vehicle cable bus for transmitting network data between vehicles, the system and method of the present invention avoids interference and other problems associated with wireless transmissions, and obviates the need to specially outfit the vehicles with dedicated network cables.

Figure 2:
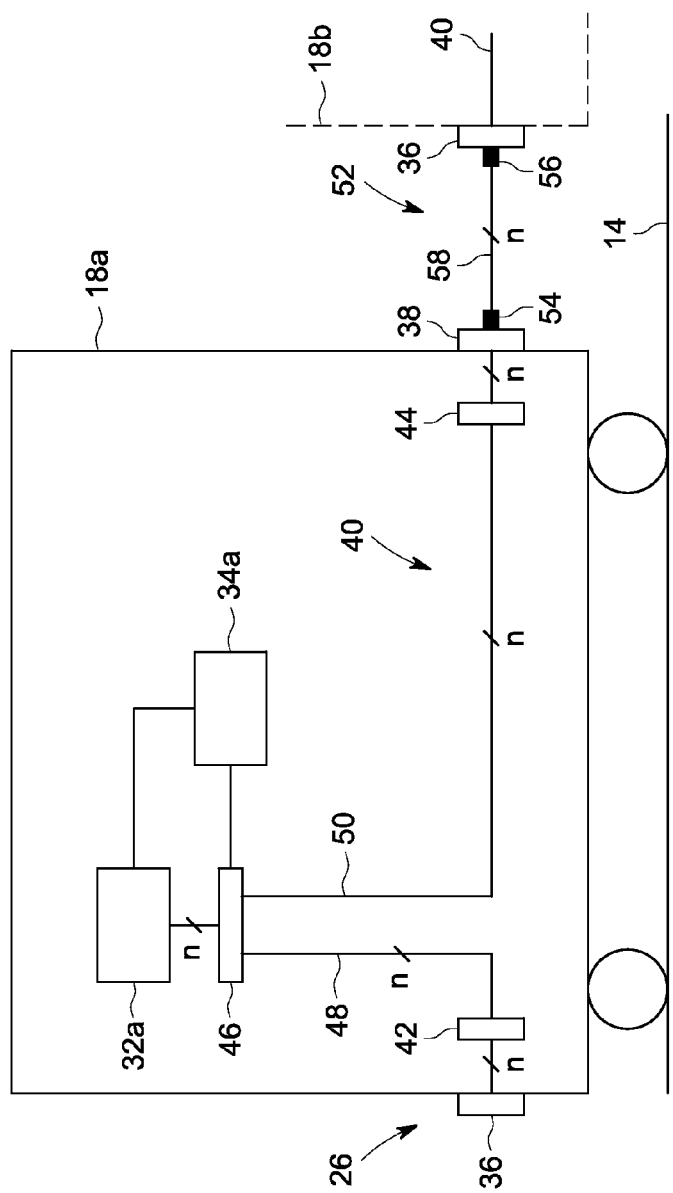
FIG. 2 is a schematic diagram of an MU cable bus in a vehicle, shown in the context of the communication system of FIG. 1.

One example of an MU cable bus 26 is shown in more detail in FIG. 2. Other configurations are possible, depending on the type of vehicle involved. As noted above, the MU cable bus 26 is an existing electrical bus interconnecting the lead vehicle 18a and the trail vehicles 18b, 18c in the consist. In each vehicle, e.g., the lead vehicle 18a as shown in FIG. 2, the MU cable bus 26 comprises a front MU port 36, a rear MU port 38, and an internal MU electrical system 40 that connects the front port 36 and the rear port 38 to one or more electronic components 32a of the vehicle 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the vehicle 18a may be electrically connected to the central terminal board 46, and thereby to the MU cable bus 26 generally. Although the front MU port 36 and rear MU port 38 may be located generally at the front and rear of the vehicle 18a, this is not always the case, and designations such as "front," "rear," "central," etc. are not meant to be limiting but are instead provided for identification purposes.

Figure 3:
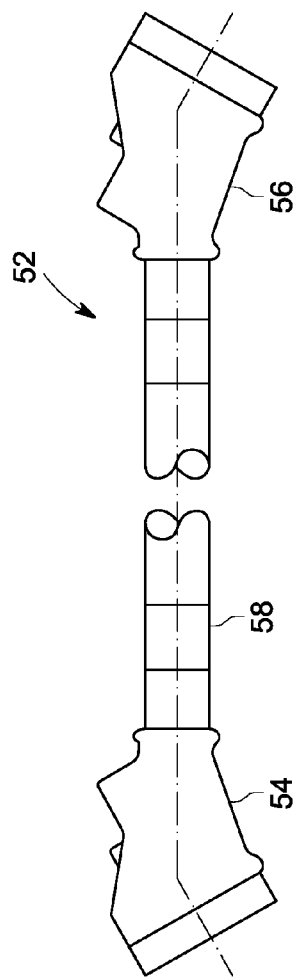
FIGS. 3 and 7 are schematic diagram of MU cable jumpers.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent vehicles 18a, 18b. As such, for each adjacent pair of vehicles 18a, 18b, one plug end 54 of an MU cable jumper 52 is attached to the rear MU port 28 of the front vehicle 18a, and the other plug end 56 of the MU cable jumper 52 is attached to the front MU port 36 of the rear vehicle 18b. The flexible cable portion 58 of the MU cable jumper 52 extends between the two plug ends, providing a flexible but secure electrical connection between the two vehicles 18a, 18b.

Depending on the particular type and configuration of vehicle, the electrical conduit portions 48, 50 and MU cable jumpers 52 may be configured in different manners, in terms of the number "n" ("n" is a real whole number equal to or greater than 1) and type of discreet electrical pathways included in the conduit or jumper. In one example, each conduit portion 48, 50 and the jumper cable portion 58 comprises a plurality of discreet electrical wires, such as 12-14 gauge copper wires. In another example, the cable portion 58 (of the MU cable jumper 52) comprises a plurality of discreet electrical wires, while the conduit portions 48, 50 each include one or more discreet electrical wires and/or non-wire electrical pathways, such as conductive structural components of the vehicle, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discreet electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the vehicle) on which terminals for wires or cables have been mounted. This provides flexibility in terms of connecting different electronic components to the MU cable bus.

The MU cable bus 26 is used in the vehicle consist 12 for transferring non-network control information 28 between vehicles 18a, 18b, 18c in the consist. "Non-network" control information 28 refers to data or other information, used in the vehicle consist for control purposes, which is not packet data. In another example, non-network control information 28 is not packet data, and does not include recipient network addresses. The non-network control information 28 is transmitted over the MU cable bus 26 according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality). The non-network control information is transmitted and received using one or more electronic components 32a-32c in each vehicle that are configured for this purpose.

The term "MU cable bus" refers to the entire MU cable bus or any portion(s) thereof, e.g., terminal boards, ports, jumper cable, conduit portions, and the like. As should be appreciated, when two vehicles are connected via an MU cable jumper 52, both the MU cable jumper 52 and the internal MU electrical systems 40 of the two vehicles together form the MU cable bus. As subsequent vehicles are attached using additional MU cable jumpers 52, those cable jumpers and the internal MU electrical systems 40 of the subsequent vehicles also become part of the MU cable bus.

As indicated in FIG. 1, in one embodiment, the vehicle consist 12 may be part of a train 60 that includes the vehicle consist 12, a plurality of railcars 62, and possibly additional vehicles or vehicle consists (not shown). Alternatively, the vehicle consist 12 may be a series of vehicles 18 other than rail vehicles. Each vehicle 18a-18c in the consist 12 is mechanically coupled to at least one other, adjacent vehicle in the consist 12, through a coupler 64. The railcars 62 are similarly mechanically coupled together and to the vehicle consist to form a series of linked vehicles. The non-network control information may be used for vehicle control purposes or for other control purposes in the train 60.

As discussed above, the communication system 10 may comprise respective router transceiver units 34a, 34b, 34c positioned in the lead vehicle 18a and each of the trail vehicles 18b, 18c in the vehicle consist 12. The router transceiver units 34a, 34b, 34c are each electrically coupled to the MU cable bus 26. The router transceiver units 34a, 34b, 34c are configured to transmit and/or receive network data 16 over the MU cable bus 26. In one embodiment, each router transceiver unit receives network data 16 from a computer unit or other electronic component 32a, 32b, 32c in the vehicle consist 12, and modulates the received network data 16 into modulated network data 30 for transmission over the MU cable bus 26. Similarly, each router transceiver unit 34a, 34b, 34c receives modulated network data 30 over the MU cable bus 26 and de-modulates the received modulated network data 30 into network data 16. "Modulated" means converted from one form to a second, different form suitable for transmission over the MU cable bus 26. "De-modulated" means converted from the second form back into the first form. The modulated network data 30 is orthogonal to the non-network control information 28 transferred between vehicles over the MU cable bus 26. "Orthogonal" means that the modulated network data does not interfere with the non-network control information, and that the non-network control information does not interfere with the modulated network data (at least not to the extent that would corrupt the data). At recipient/subsequent vehicles, the modulated network data 30 is received over the MU cable bus 26 and de-modulated back into the network data 16 for use by a vehicle electronic component 32a, 32b, 32c.

The network data 16 is data that is packaged in packet form, meaning a data packet that comprises a set of associated data bits 20. Each data packet 20 may include a data field 22 and a network address or other address 24 uniquely associated with a computer unit or other electronic component 32a-32c in the consist 12. The network data 16 may be TCP/IP-formatted or SIP-formatted data, however, the electronic components and/or router transceiver units may use other communications protocols for communicating network data. As should be appreciated, the MU cable bus 26, electronic component 32a-32c, and router transceiver units 34a-34c together form a local area network. In one embodiment, these components are configured to form an Ethernet network.

Figure 4:
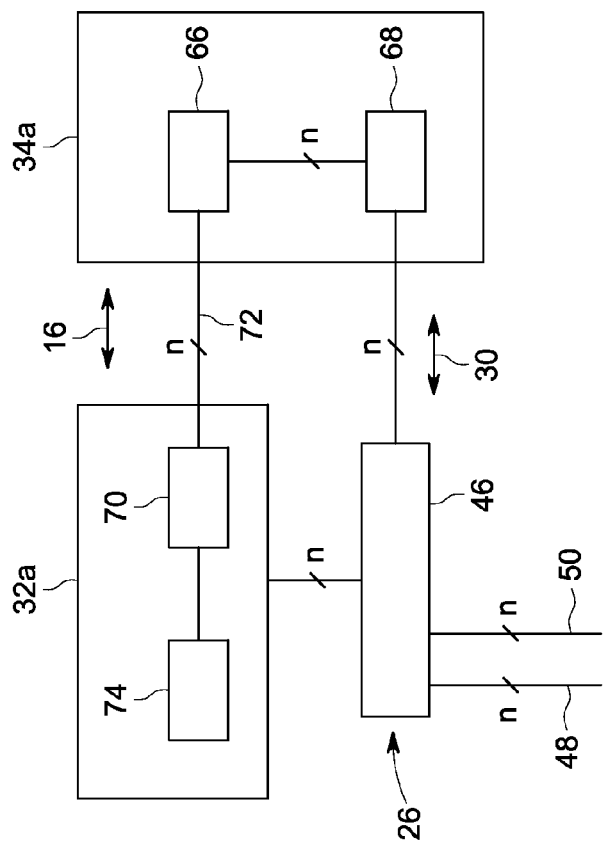
FIG. 4 is a schematic diagram of a router transceiver unit according to an embodiment of the present invention.

FIG. 4 shows one embodiment of a router transceiver unit 34a in more detail. The router transceiver unit 34a comprises a network adapter module 66 and a signal modulator module 68. The signal modulator module 68 is electrically connected to the network adapter module 66 and to the MU cable bus 26. In the example shown in FIG. 4, the signal modulator module 68 is electrically connected to the MU cable bus 26 by way of the central terminal board 46, near a vehicle electronic component 32a. The network adapter module 66 is electrically connected to a network interface unit 70 that is part of and/or operably connected to the electronic component 32a. (The electronic component 32a may be, for example, a computer unit for controlling a vehicle.) The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32a that are configured for network communications. In one embodiment, the network interface unit 70, network cable 72, and software or hardware applications 74 include standard Ethernet-ready (or other network) components. For example, if the electronic component 32a is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which it then conveys to the network adapter module 66 for transmission to the network interface unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one both of the network adapter module 66 and the signal modulator module 68 may perform network data routing functions.

The signal modulator module 68 includes an electrical output (e.g., port, wires) for electrical connection to the MU cable bus 26, and internal circuitry (e.g., electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bitrate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data 16.

Figure 5:
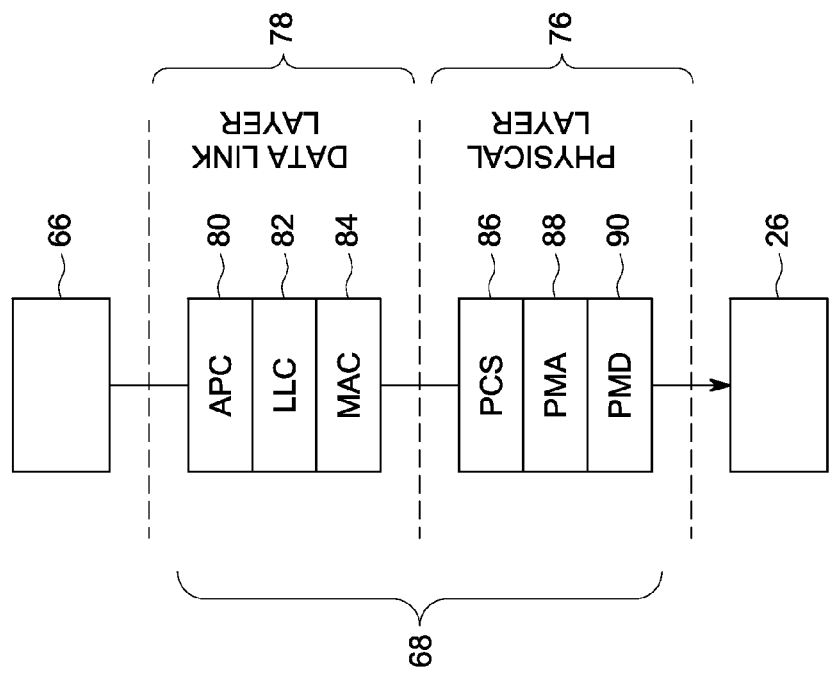
FIG. 5 is a schematic diagram illustrating the functionality of a signal modulator module portion of a router transceiver unit, according to an embodiment of the present invention.

FIG. 5 shows one possible example of how the signal modulator module 68 could function, cast in terms of the OSI network model, according to one embodiment of the present invention. In this example, the signal modulator module 68 includes a physical layer 76 and a data link layer 78. The data link layer 78 is divided into three sub-layers. The first sub-layer is an application protocol convergence (APC) layer 80. The APC layer accepts Ethernet (or other network) frames 16 from an upper application layer (e.g., the network adapter module 66) and encapsulates them into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus. The other sub-layers are medium independent, i.e., do not depend on the configuration of the MU cable bus.

Figure 6:
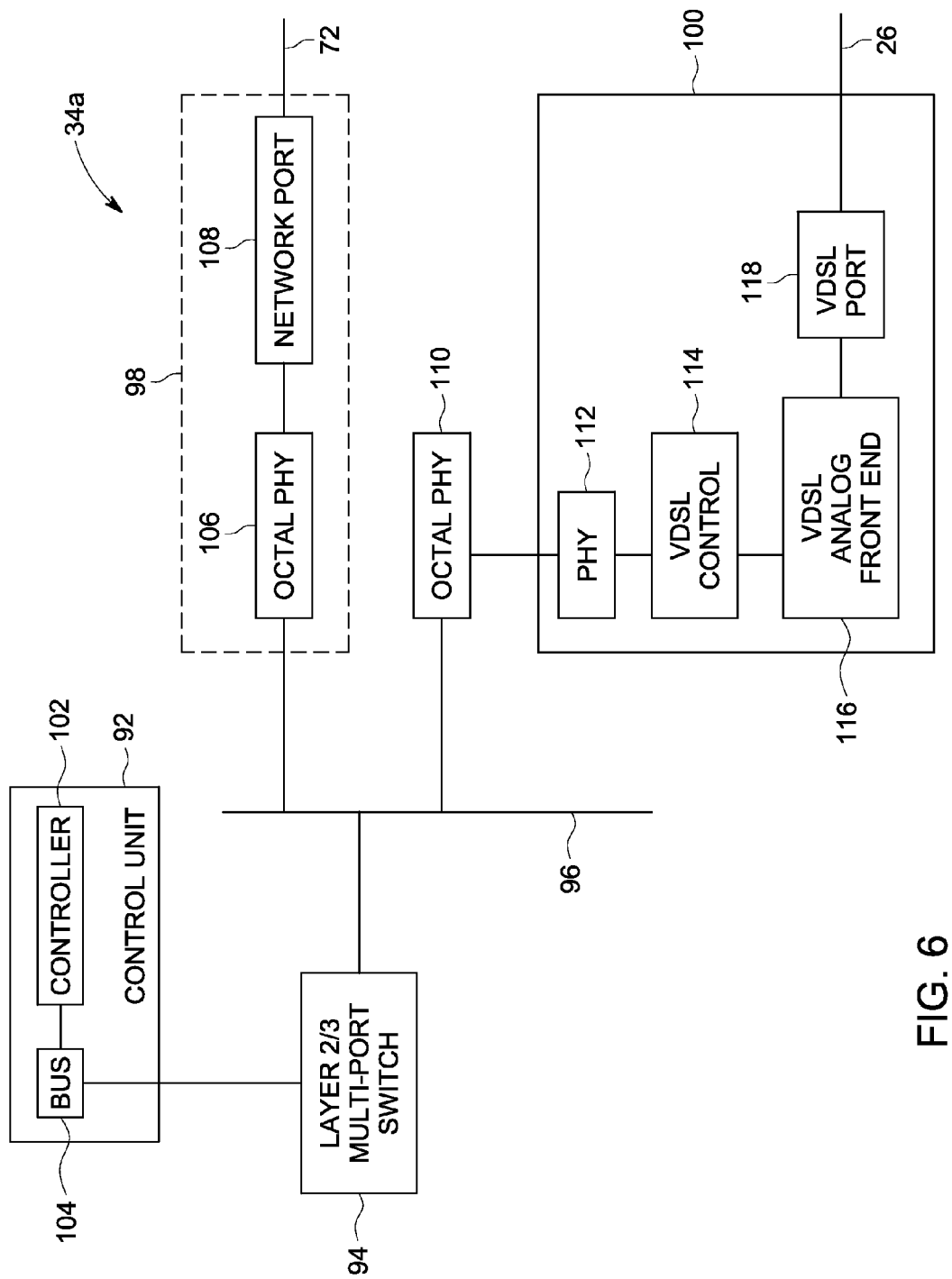
FIG. 6 is a circuit diagram of another embodiment of a router transceiver unit.

FIG. 6 is a circuit diagram of another embodiment of a router transceiver unit 34a. In this embodiment, the router transceiver unit 34a comprises a control unit 92, a switch 94, a main bus 96, a network interface portion 98, and a VDSL module 100. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle) for receiving a network cable 72.

The VDSL module 100 is also connected to the main bus 96 by way of an octal PHY unit 110, which may be the same unit as the octal PHY portion 106 or a different octal PHY unit. The VDSL module 100 comprises a physical interface portion (PHY) 112 electrically connected to the octal PHY unit 110, a VDSL control 114 electrically connected to the physical interface portion 112, a VDSL analog front end unit 116 electrically connected to the VDSL control 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL control 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 100 to the MU cable bus 26. Overall operation of the router transceiver unit 34a shown in FIG. 6 is similar to what is described in relation to FIGS. 1, 2, and 4.

Another embodiment of the invention relates to a method for communicating data in a vehicle consist 12. The method comprises transmitting network data 16, 30 between vehicles 18a-18c within a vehicle consist 12. (Each vehicle 18a-18c is adjacent to and mechanically coupled with one or more other vehicles in the consist.) The network data 16, 30 is transmitted over a vehicle multiple unit (MU) cable bus 26 interconnecting at least adjacent vehicles 18a, 18b in the consist 12. The MU cable bus 12 is an existing cable bus used in the vehicle consist 12 for transferring non-network control information 28 between vehicles 18a-18c in the consist 12.

In another embodiment, the method further comprises, at each of one or more of the vehicles 18a-18c in the vehicle consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32a-32c of the vehicles.

As should be appreciated, it may be the case that certain vehicles in a consist are network equipped according to the system and method of the present invention, e.g., outfitted with a router transceiver unit, and that other vehicles in the consist are not. For example, there may be first and third network-equipped vehicles physically separated by a second vehicle that is not network equipped. In this case, the first and third vehicles are still able to communicate and exchange data even though there is a non-network equipped vehicle between them. This is possible because all the vehicles are still electrically connected via the MU cable bus. In one case, for example, a vehicle consist comprises first, second, and third vehicles, with the second vehicle being disposed between the first and third vehicles. A first router transceiver unit is positioned in the first vehicle, and a second router transceiver unit is positioned in the third vehicle. The second vehicle, however, does not have a router transceiver unit or other functionality for transmitting and/or receiving network data over the MU cable bus. Nevertheless, network data is transmitted between the first and third vehicles through the second vehicle, with the network data passing through a portion of the MU cable bus in the second vehicle but not being transmitted or received by the second vehicle.

In another embodiment, the method further comprises controlling at least one of the vehicles 18a-18c in the consist based at least in part on the network data 16.

The vehicle consist 12 may be part of a train 60 that comprises the vehicle consist 12 and a plurality of railcars 62. Here, the non-network control information 28 may be train control information that is transmitted over the MU cable bus according to a designated voltage carrier signal (e.g., +74V).

Figure 7:
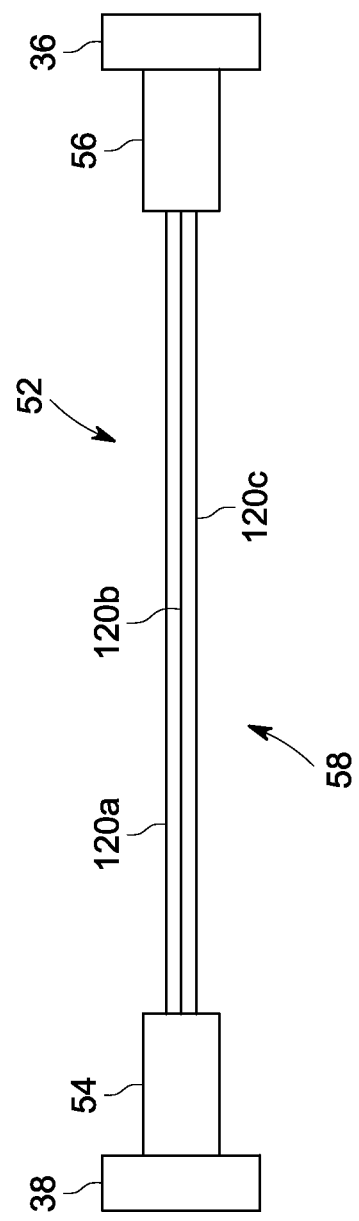

With reference to FIG. 7, if the MU cable jumper 52 and/or internal electrical system 40 includes plural discreet electrical wires or other electrical or conductive pathways 120a-120c, e.g., three discreet electrical wires 120a-120c as shown in FIG. 7, it may be the case that network data 30 is transmitted over only one of the plural discreet electrical wires or other electrical pathways. This may depend on what each pathway is used for in the vehicle consist and what type of information it carries. For example, it may be undesirable to transmit network data over a wire 120a that carries analog non-network data, whereas a wire 120b that carries a digital signal (on +V, off 0 V) is more desirable for transmitting network data. While the illustrated embodiment only shows three conductive pathways 120, the MU cable bus 26 may include a different number of conductive pathways 120, such as 27 conductive wires.

Another embodiment of the present invention relates to a communication system 10 for communicating data in a vehicle consist 12. The system 10 comprises a respective router transceiver unit 34a-34c positioned in each vehicle 18a-18c of a vehicle consist 12. Each router transceiver unit 34a-34c is coupled to a vehicle multiple unit (MU) cable bus 26 in the vehicle consist 12 that interconnects adjacent vehicles 18a, 18b. The MU cable bus 16 is an existing cable bus used in the vehicle consist for transferring non-network control information 28 between vehicles within the vehicle consist. Each router transceiver unit 34a-34c is configured to transmit and/or receive network data 16, 30 over the MU cable bus 26.

In another embodiment of the system 10, each router transceiver unit 34a-34c is configured to convert the network data 16 into modulated network data 30 for transmission over the MU cable bus 26. The modulated network data being orthogonal to the non-network control information transferred between vehicles over the MU cable bus. Each router transceiver unit is further configured to de-modulate the modulated network data received over the MU cable bus for use by electronic components in the vehicles of the consist.

Another embodiment relates to a communication system for communicating data in a vehicle consist 12. In this embodiment, the system comprise a respective router transceiver unit 34a-34c positioned in each of a plurality of vehicles 18a-18c in the consist 12. The system further comprises, in each of the plurality of vehicles, a respective electronic component 32a-32c (e.g., computer unit) positioned in the vehicle and operably coupled to the router transceiver unit in the vehicle. The router transceiver units 34a-34c are electrically coupled to a vehicle multiple unit (MU) cable bus 26, which is an existing cable bus used in the consist for transferring non-network control information 28 between the plurality of vehicles. The router transceiver units 34a-34c are configured to transmit and/or receive network data 16, 30 over the MU cable bus 16, the network data originating at one of electronic components 32a-32c and being addressed to another of the electronic components 32a-32c. Each router transceiver unit may be configured to convert the network data into modulated network data for transmission over the MU cable bus (the modulated network data being orthogonal to the non-network control information transferred between vehicles over the MU cable bus), and to de-modulate the modulated network data received over the MU cable bus for use in one of the electronic components.

Another embodiment relates to a communication system for communicating data in a vehicle consist 12. The system comprises a computer network in the consist. The computer network comprises a respective electronic component 32a-32c positioned in each of a plurality of vehicles 18a-18c in the consist 12 and a vehicle multiple unit (MU) cable bus 26. The MU cable bus 26 interconnects the electronics components and is an existing cable bus used in the consist for transferring non-network control information 28 between the vehicles. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to carry out the functionality of the router transceiver units 34a-34c as described above, and/or the router transceiver units 34a-34c are part of (or comprise the electronic components. The computer network may be an Ethernet network.

Another embodiment relates to a method for retrofitting a vehicle for network data communications. The method comprises outfitting a vehicle with a router transceiver unit, interfacing the router transceiver unit with an electronic component of the vehicle, and interfacing the router transceiver unit with a multiple unit (MU) cable bus of the vehicle. The MU cable bus is an existing cable bus used for transferring non-network control information between vehicles in a consist. The router transceiver unit is configured to transmit and/or receive network data over the MU cable bus.

Another embodiment relates to a method for retrofitting a vehicle consist for network data communications. The method comprises, at each of a plurality of vehicles 18a-18c in a consist 12, outfitting the vehicle with a respective router transceiver unit 34a-34c, interfacing the router transceiver unit 34a-34c with an electronic component 32a-32c of the vehicle, and interfacing the router transceiver unit 34a-34c with a multiple unit (MU) cable bus 26 of the vehicle. The MU cable bus is an existing cable bus used for transferring non-network control information between vehicles in the consist. Each router transceiver unit is configured to transmit and/or receive network data 16, 30 over the MU cable bus 26.

Any of the embodiments described herein are also applicable for communicating data in vehicle consists generally. "Vehicle consist" refers to a group of vehicles that are mechanically coupled or linked together to travel along a route.

For example, one embodiment of the present invention relates to a system and method for communicating data in a vehicle consist 12. In this embodiment, network data 16, 30 is transmitted from a first vehicle 18a in the vehicle consist 12 to a second vehicle 18b in the vehicle consist. The network data 16, 30 is transmitted over an existing electrical cable bus 26 that interconnects the first vehicle 18a and the second vehicle 18b. The existing electrical cable bus 26 is used in the vehicle consist 12 for transferring non-network control information 28 between the first vehicle and the second vehicle. As should be appreciated, this method and system is applicable to communicating data between any of the linked vehicles 18a-18c, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

In any of the embodiments set forth herein, the network data may be TCP/IP-formatted or SIP-formatted data. Additionally, each vehicle may include a computer unit, with the computer units 32a-32c communicating with one another by transmitting the network data, formatted as TCP/IP data or SIP data or otherwise, over the existing electrical cable bus 26, and the computer units thereby forming a computer network, e.g., an Ethernet-type network.

In any of the embodiments set forth herein, the data transmitted over the MU cable bus or other existing electrical cable bus may additionally or alternatively be "high bandwidth" data, meaning data transmitted at average rates of 10 Mbit/sec or greater. (In one aspect, the data is high bandwidth data. In another aspect, the data is network data. In another aspect, the data is both high bandwidth data and network data, referred to herein as "high bandwidth network data," meaning data that is packaged in packet form as data packets and transmitted over the MU cable bus at average rates of 10 Mbit/sec or greater.) This reflects that the communication system (and associated method) are applicable for realizing a high information density communication environment in a vehicle consist, i.e., it is possible to exchange relatively large amounts of data between vehicles in a timely manner. In contrast, "low bandwidth" data is data transmitted at average rages of less than 10 Mbit/sec, and "very low bandwidth" data (a type of low bandwidth data) is data transmitted at average rates of 1200 bits/sec or less.

In any of the embodiments described herein, the existing electrical cable bus 26 may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 8:
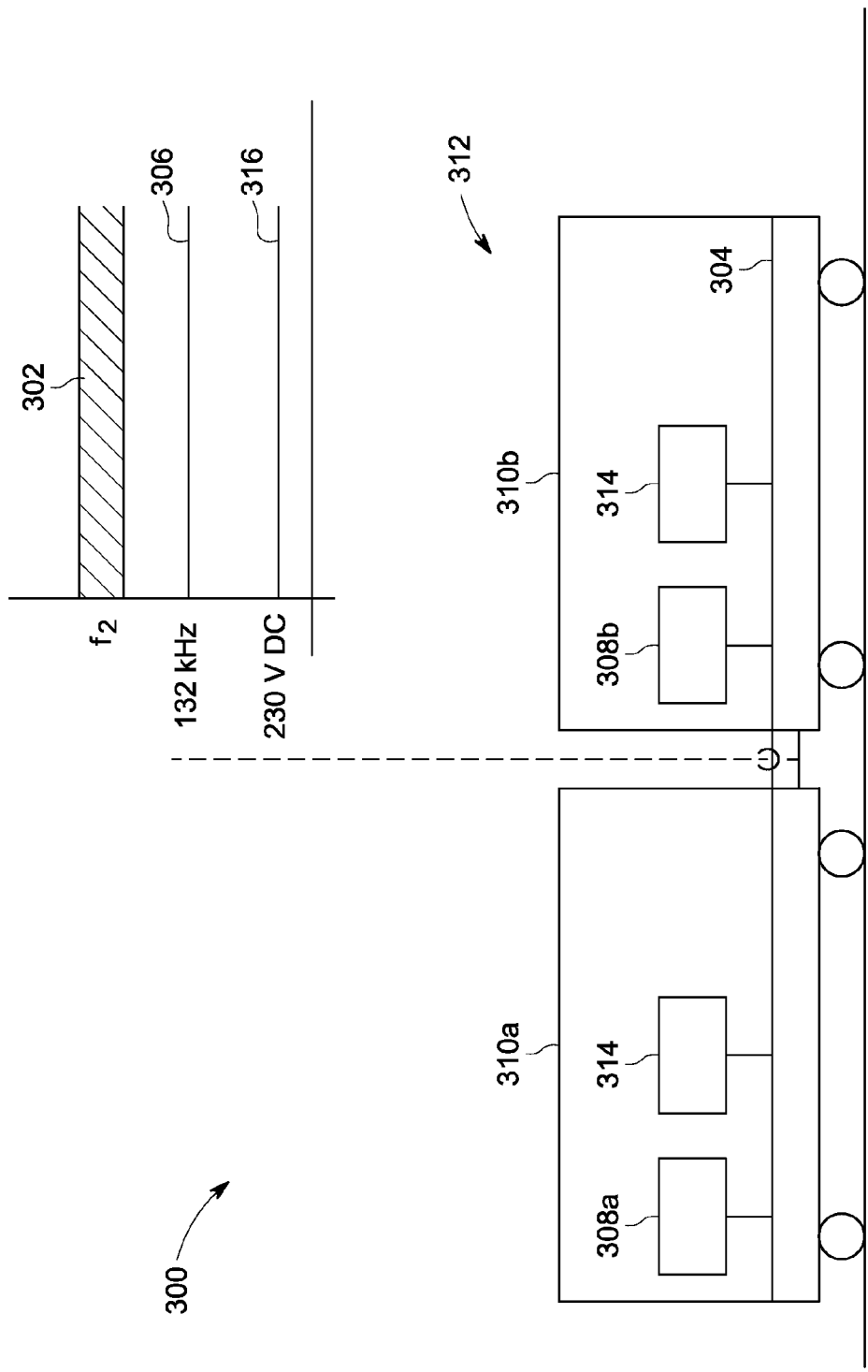
FIG. 8 is a schematic diagram of an embodiment of the communication system implemented in conjunction with an ECP train line.

In an embodiment, with reference to FIG. 8, a system 300 for communicating data in a vehicle consist or other vehicle consist is configured to transmit network and/or high bandwidth data 302 over an ECP train line 304, in a manner orthogonal to ECP brake data 306 transmitted over the ECP train line 304. The system 300 comprises a router transceiver unit 308a, 308b on each of a plurality of vehicles 310a, 310b in a consist 312. (The plurality of so-equipped vehicles may be fewer than all the vehicles in the consist.) On each vehicle, the router transceiver unit 308a, 308b is in addition to an ECP transceiver 314 on the vehicle. Alternatively, an ECP transceiver may be reconfigured to include the functionality of the router transceivers 308a, 308b. Each router transceiver unit 308a, 308b is electrically connected to the ECP train line 304, and is configured to transmit network and/or high bandwidth data 302 over the ECP train line 304 at one or more frequencies $f_2$ (i) that are different than the 132 kHz frequency of the ECP brake data 306, (ii) that do not interfere with (or receive significant interference from) the ECP brake data 306, and (iii) that do not interfere with (or receive significant interference from) the 230V DC signal 316 present on the ECP train line 304. (That is, the data 302 is orthogonal to the data 306 and DC signal 316.) For example, the network and/or high bandwidth data may be modulated into a carrier wave/RF signal transmitted over the ECP train line at a frequency in the megahertz (MHz) range. The router transceiver units 308a, 308b may be similar to the router transceiver units 34 described above. The embodiment of FIG. 8 may be implemented in conjunction with any of the other embodiments described herein. Also, in the case where certain vehicles in a consist are not equipped with router transceivers 308a, 308b, the data 302 will nevertheless be transmitted over the ECP train line extending through such vehicles, for eventual reception by vehicles that are equipped with the router transceivers 308a, 308b.

As should be appreciated, the system 300 establishes a high bandwidth data network that operates superimposed on, and separate from, the 132 kHz communication link that is specified in the 4200 series specifications for ECP brake traffic between the vehicle and other vehicles, such as rail cars. In one aspect, the data network is used to communicate non-brake data (e.g., in the form of network and/or high bandwidth data) between vehicles in a consist. Examples of the data that may be transferred include vehicle sensor data indicative of vehicle health, commodity condition data, temperature data, weight data, security data, data as otherwise specified herein, and/or other data. In another aspect, the data network is used to communicate brake data in addition, or instead of, the 132 kHz communication link. The brake data may be in addition to other data transmitted over the data network.

In another embodiment, the network data is converted at one of the vehicles into modulated network data for transmission over the MU cable bus. The modulated network data is orthogonal to the non-network control information transferred between the lead and trail vehicles over the MU cable bus. "Orthogonal" means that the modulated network data does not interfere with the non-network control information, and that the non-network control information does not interfere with the modulated network data. At another vehicle in the consist (e.g., a recipient vehicle), the modulated network data is received over the MU cable bus and de-modulated for use by a computer unit or other electronic component in the vehicle.

Another embodiment relates to a communication system for communicating data in a vehicle consist. The system comprises respective router transceiver units positioned in the lead vehicle and each of the trail vehicles in the vehicle consist. The router transceiver units are each electrically coupled to an MU cable bus in the vehicle consist that interconnects the lead vehicle and the trail vehicles. The MU cable bus is an existing cable bus that is used in the vehicle consist for transferring non-network control information between the lead and trail vehicles. The router transceiver units are configured to transmit and/or receive network data over the MU cable bus.

In another embodiment of the communication system, each router transceiver unit is configured to convert the network data into modulated network data for transmission over the MU cable bus, and to de-modulate modulated network data received over the MU cable bus back into network data, for use in communicating data between electronic components in the vehicle consist or otherwise. The modulated network data is orthogonal to the non-network control information transferred between the lead and trail vehicles over the MU cable bus.

In another embodiment, with reference to FIGS. 9-12, in a vehicle 18*a* equipped with the communication system, the communication system further comprises at least one cable run 400 connecting the router transceiver unit 34*a* to the MU cable bus 26. "Cable run" means a length of electrical cabling or other electrical conductor 402, 404, which may include one discreet electrical pathway or a plurality of discreet electrical pathways (e.g., a bundled cable). The cable run 400 bypasses a portion of the MU cable bus 26 within the vehicle (i.e., it bypasses part or all of the internal MU electrical system 40), so that network data travels over less of the MU cable bus than it would without the cable run in place. Thus, in one aspect of the invention, the cable run 400 is installed in a vehicle, around and bypassing at least part of the MU cable bus, to provide a cleaner and less interference prone signal pathway for the network data, relative to levels of interference that are present if the bypassed portion of the MU cable bus was not bypassed. This may be useful for older vehicles where the internal MU electrical system 40 is prone to interference, and/or for improving data throughput levels between a consist of three, four, or more vehicles.

Figure 9:
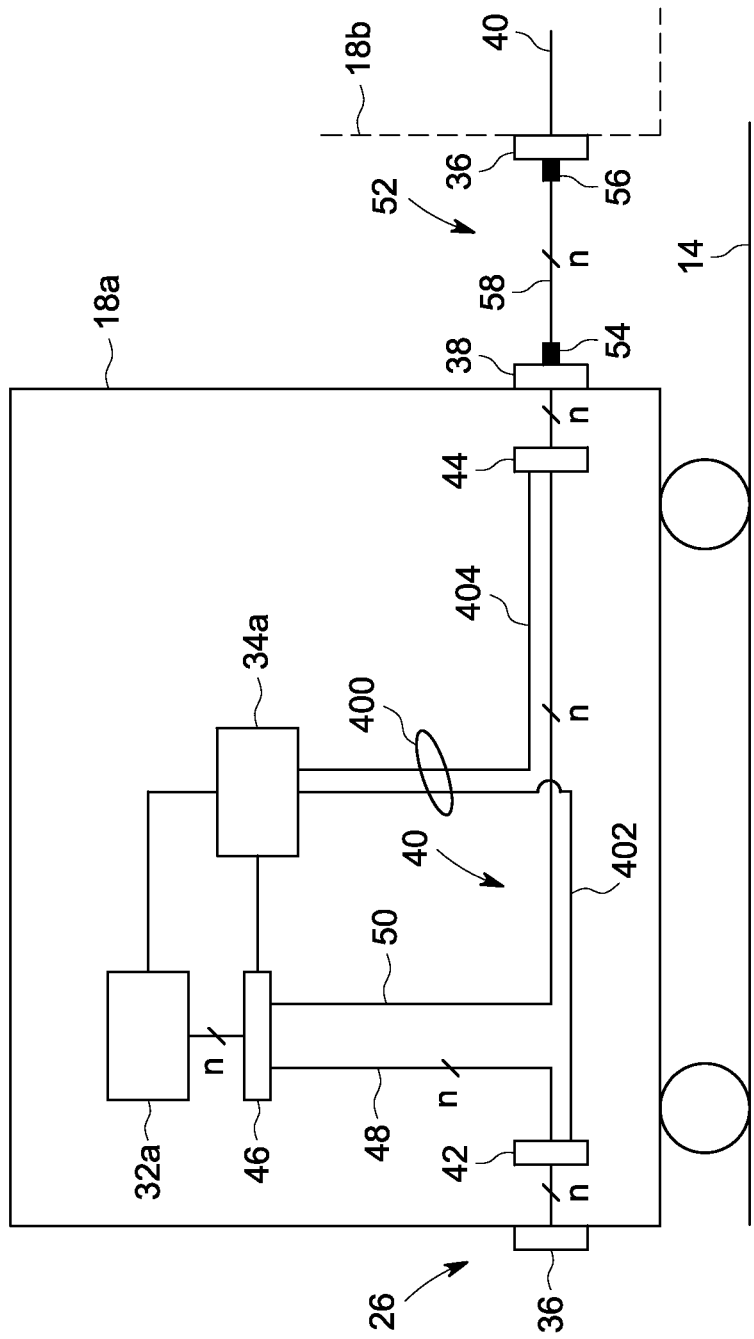
FIGS. 9-12 are schematic diagrams of various embodiments of the communication system using a cable run to bypass part of the MU cable bus in a vehicle.
Figure 10:
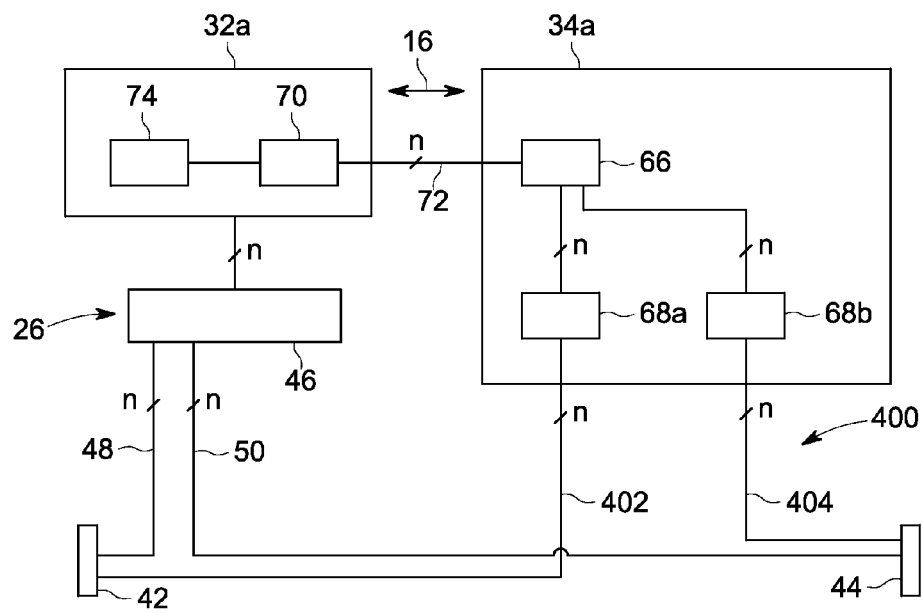

FIGS. 9 and 10 show embodiments of the communication system where the cable run 400 includes a first length of electrical conductor 402 and a second, separate length of electrical conductor 404. The first length of electrical conductor 402 electrically connects the router transceiver unit 34*a* to the front terminal board 42 of the vehicle 18*a*, which is electrically connected to the front MU port 36 of the vehicle. The second length of electrical conductor 404 connects the router transceiver unit 34*a* to the rear terminal board 44, which is electrically connected to the rear MU port 38 of the vehicle. Here, the portion of the MU cable bus that is bypassed by the cable run 400 comprises the entirety of the MU cable bus 26 in the vehicle that extends between the front terminal board 42 and the rear terminal board 44 (e.g., first and second electrical conduit portions 48, 50 and central terminal board 46). As can be seen, the router transceiver unit 34*a* is still locally connected to an electronic component 32*a* in the vehicle for the exchange of network data there between, e.g., the router transceiver unit 34*a* acts as an Ethernet port for the electronic component 32*a*. However, instead of the router transceiver unit 34*a* being connected to the central terminal board 46 for modulating and de-modulating network data onto and off of the MU cable bus, the router transceiver unit 34*a* is instead connected to the front terminal board 42 and the rear terminal board 44 for this purpose, by way of the first and second lengths of electrical conductor 402, 404 of the cable run 400. It is contemplated that the cable run 400 will provide a cleaner and less interference prone signal pathway for network data, versus the network data traveling over the bypassed portion of the MU cable bus.

With reference to FIG. 10, in another embodiment, the router transceiver unit 34*a* comprises a network adapter module 66 and first and second signal modulator modules 68*a*, 68*b* connected to the network adapter module 66. The first signal modulator module 68*a* is also connected to the first length of electrical conductor 402, and the second signal modulator module 68*b* is also connected to the second length of electrical conductor 404. Each signal modulator module 68*a*, 68*b* is configured to receive the network data from the network adapter module 66 and to modulate the network data into modulated network data for transmission over the cable run 400 (e.g., over the length of electrical conductor 402 or 404 to which it is connected) and the non-bypassed portion of the MU cable bus 26. Each signal modulator module 68*a*, 68*b* is also configured to receive modulated network data over the cable run 400 (e.g., over the length of electrical conductor 402 or 404 to which it is connected) and to de-modulate the modulated network data into network data for providing to the network adapter module 66. The network adaptor module 66 transceives (transmits and receives) network data between the signal modulator modules and one or more electronic components 32*a* in the vehicle.

As should be appreciated, the signal modulator modules 68*a*, 68*b* are separately disposed in the "front" and "rear" portions, respectively, of the network data communication pathway in the communication system. Thus, the second signal modulator module 68*b* will receive modulated network data arriving over the second length of electrical conductor 404 from the rear of the consist, and the first signal modulator module 68*a* will receive modulated network data arriving over the first length of electrical conductor 402 from the front of the consist (assuming in this example that the terminal boards 42, 44 are oriented at the front and rear of the consist, respectively). Additionally, the network adapter module 66 is interfaced with the signal modulator modules 68*a*, 68*b* so that network data intended for locations towards the front of the consist is communicated to the first signal modulator module 68*a*, and so that network data intended for locations towards the rear of the consist is communicated to the second signal modulator module 68*b*. Alternatively or additionally, depending on network configuration, the network adapter module 66 may simply present all network data to both signal modulator modules 68*a*, 68*b*, with the network data in effect being transmitted both to the front and rear of the consist. It is contemplated that the use of two signal modulator modules, one on each leg 402, 404 of the network data communication pathway, will substantially increase signal to noise ratio, allowing for greater data throughput across multiple vehicles in a consist.

Figure 11:
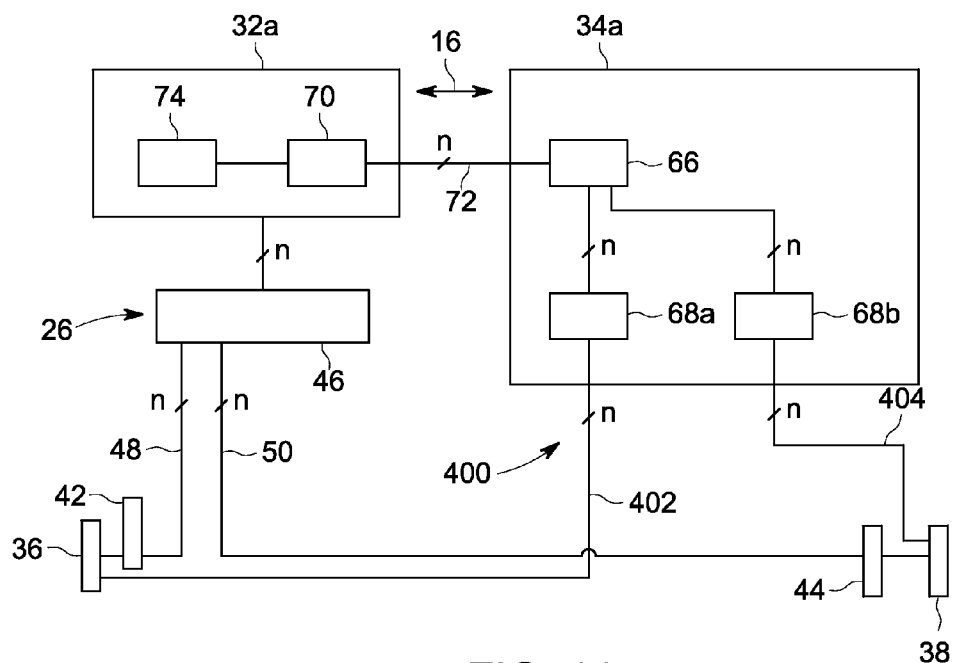

With reference to FIG. 11, instead of connecting the cable run 400 to the terminal boards 42, 44, the cable run 400 connects the router transceiver unit 34*a* to the front MU port 36 of the vehicle and to the rear MU port 38 of the vehicle 18*a*. Here, the portion of the MU cable bus that is bypassed comprises the entirety of the MU cable bus in the vehicle that extends between the front MU port and the rear MU port, in other words, the entirety of the internal MU electrical system 40 is bypassed. The cable run 400 may comprise first and second separate lengths of electrical conductor 402, 404, and the router transceiver unit 34*a* may comprise first and second signal modulator modules 68*a*, 68*b*, similar to as described above in regards to FIG. 10.

Figure 12:
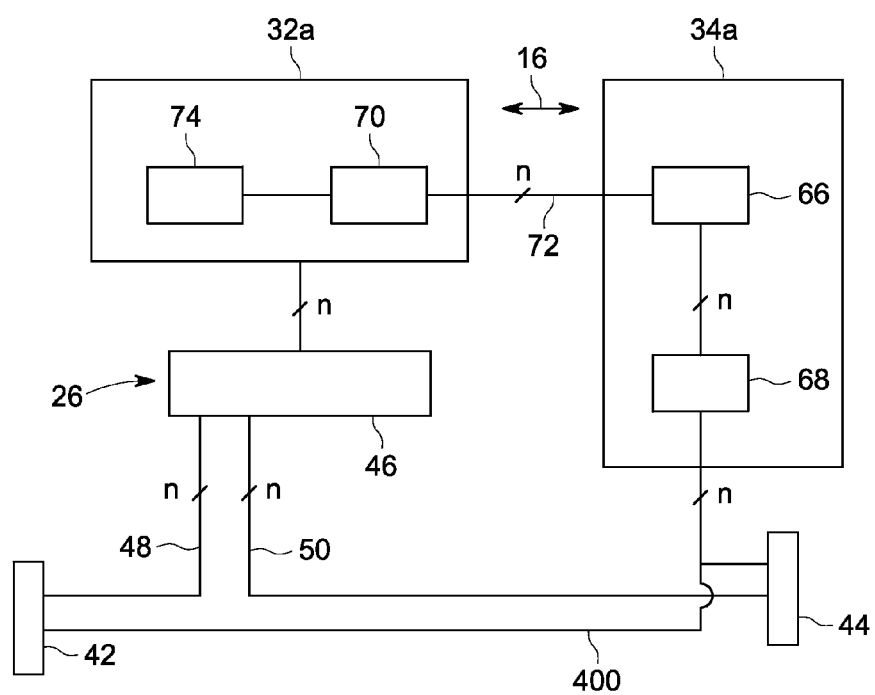

With reference to FIG. 12, instead of two separate lengths of electrical conductor 402, 404, the cable run 400 may comprise a single length of electrical conductor (which includes one or more discreet electrical pathways) that connects the router transceiver unit 34*a* to the terminal boards 42, 44. Alternatively, the single length of electrical conductor may connect the router transceiver unit 34*a* to the front and rear MU ports 36, 38. In such an embodiment, the router transceiver unit 34*a* may have only one signal modulator module 68.

Figure 13:
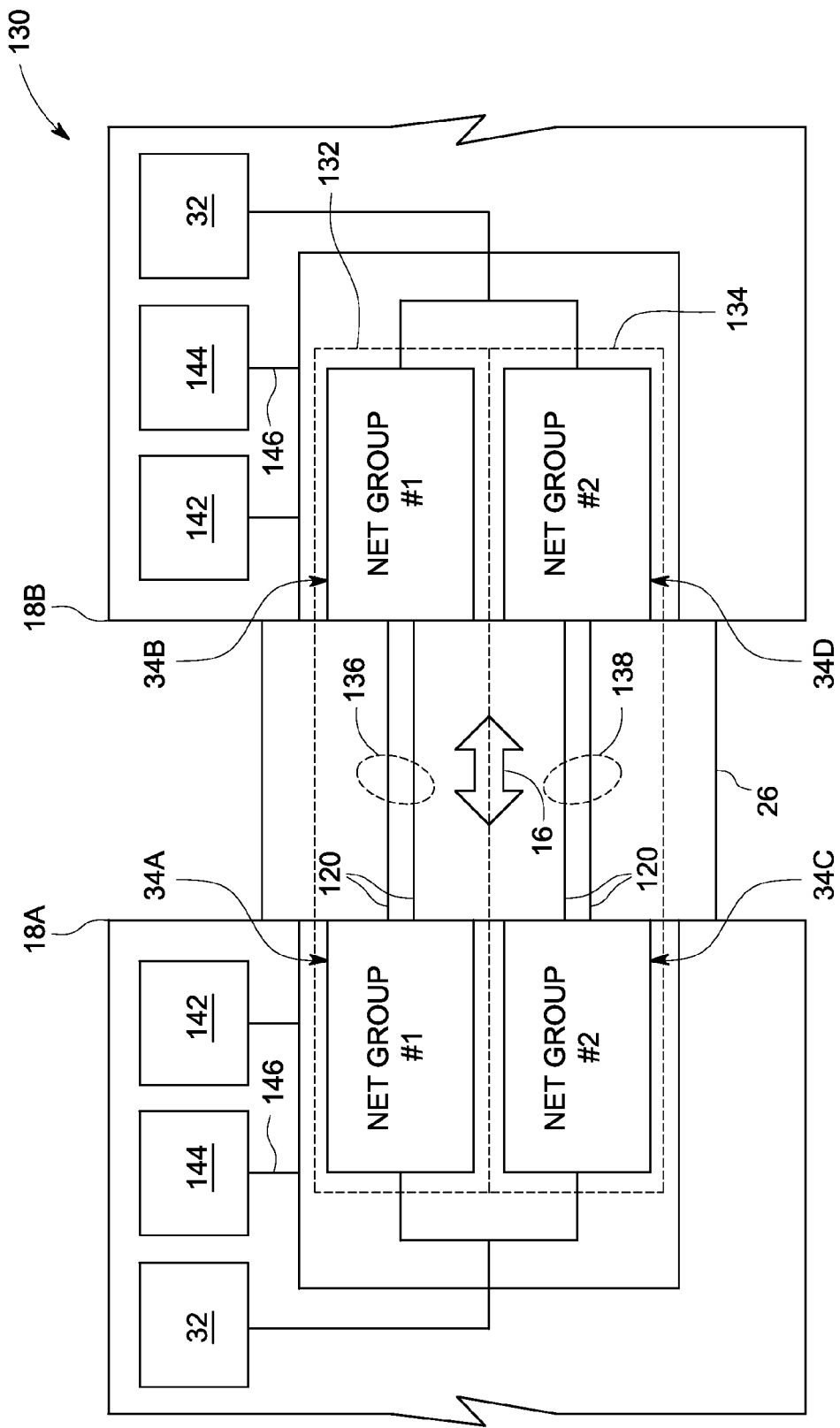
FIGS. 13-16 are schematic diagrams of various embodiments of the communication system, having a redundant router transceiver pair, according to an embodiment of the invention.
Figure 14:
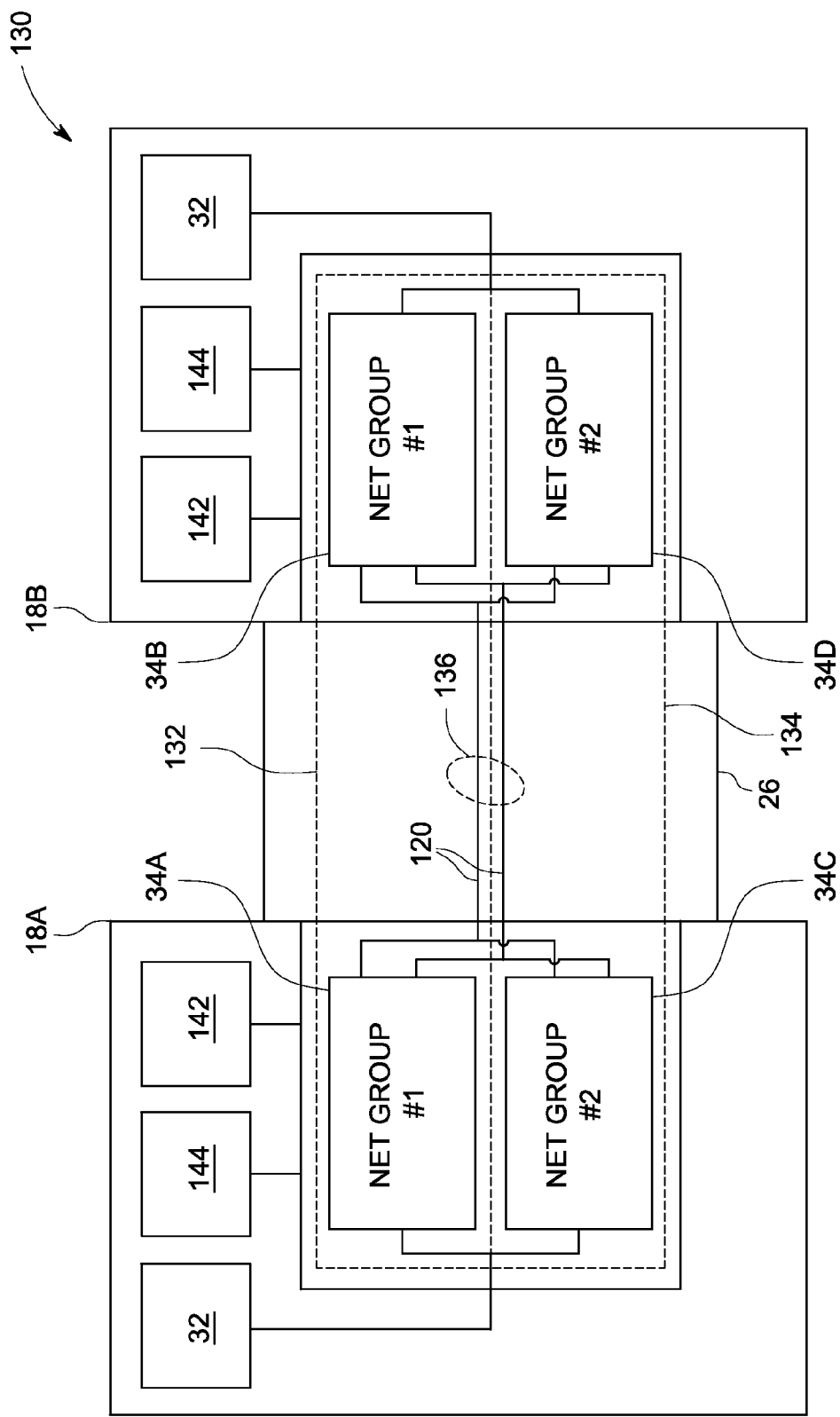
Figure 15:
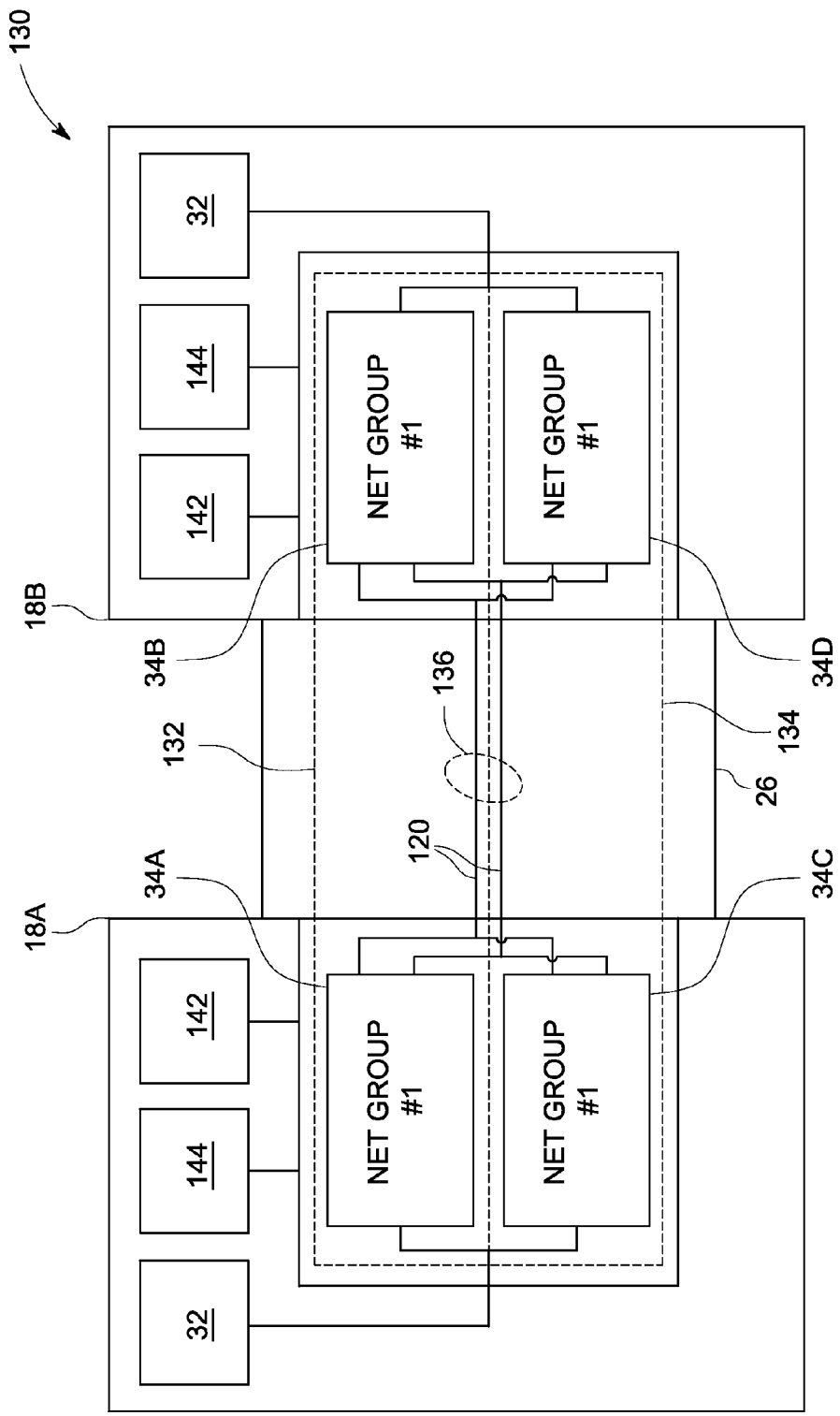

Turning now to FIGS. 13-15, in another embodiment, a communication system 130 for communicating data in a vehicle consist comprises a first router transceiver pair 132 and a redundant (second) router transceiver pair 134. "Router transceiver pair" means two router transceiver units, each in a different vehicle; the two units may be logically connected, e.g., in the same network group (described below), or not. The first router transceiver pair 132 comprises a first router transceiver unit 34a positioned in a first vehicle 18a of the vehicle consist and a second router transceiver unit 34b positioned in a second vehicle 18b of the vehicle consist. The redundant router transceiver pair 134 comprises a third router transceiver unit 34c positioned in the first vehicle 18a and a fourth router transceiver unit 34d positioned in the second vehicle 18b. Each of the first, second, third, and fourth router transceiver units 34a, 34b, 34c, 34d is coupled to a vehicle MU cable bus 26 in the vehicle consist that interconnects the first and second vehicles 18a, 18b. Also, each of the first, second, third, and fourth router transceiver units 34a, 34b, 34c, 34d is configured to transmit and/or receive network data 16 over the MU cable bus 26.

The system 130 includes one or more control modules 174 and switch modules 172 communicatively coupled with the router transceiver pairs 132, 134. As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The module may represent the hardware that operates based on software or hardwired instructions, the software that directs hardware to perform the operations, or a combination thereof. For example, one or more of the modules 172, 174 may be embodied in a computer processor that operates based on one or more sets of instructions (e.g., hard-wired logic and/or software), instructions that direct a processor to perform operations, and/or a combination of a processor and the instructions. Alternatively, the control module 174 may include the switch module 172. For example, the switch module 172 may be a component of the control module 174.

In the illustrated embodiment, each of the vehicles 18a, 18b includes the control module 174 and the switch module 172. Alternatively, only one of the vehicles 18a, 18b may include the control module 174 and the switch module 172. The control module 174 and the switch module 172 may be communicatively coupled with the router transceiver pairs 132, 134 by one or more wired and/or wireless connections.

The switch module 172 controls which of the router transceiver pairs 132, 134 communicates the network data 16 over the cable bus 26. For example, the switch module 172 may operate as an electric switch alternates between a first position and a second position. In the first position, the first router transceiver pair 132 is permitted to communicate network data 16 over the cable bus 26 and the second router transceiver pair 134 is prohibited from communicating network data 16 over the cable bus 26. In the second position, the second router transceiver pair 134 is permitted to communicate network data 16 over the cable bus 26 and the first router transceiver pair 132 is prohibited from communicating network data 16 over the cable bus 26.

The control module 174 interfaces with the router transceiver pairs 132, 134 via the switch module 172 to control which of the router transceiver pairs 132, 134 communicates (e.g., transmits or receives) network data through the MU cable bus 26. For example, the control module 174 may form instructions that are sent to the switch module 172 to control the state of switch module 172. In one embodiment where each of multiple vehicles 18a, 18b include a control module 174 and/or a switch module 172, a priority scheme may be used to determine which control module 174 decides the router transceiver pairs 132, 134 that are permitted to communicate network data 16 and/or which switch module 172 implements the instructions of the control module 174 (e.g., permits one router transceiver pair 132 or 134 to communicate network data 16 but prevents the other router transceiver pair 134 or 132 to communicate network data 16).

In the illustrated embodiment, the first and third router transceiver units 34a, 34c define a first router transceiver set that is disposed on-board the first vehicle 18a while the second and fourth router transceiver units 34b, 34d define a second router transceiver set disposed on-board the second vehicle 18b. The router transceiver units 34a, 34b, 34c, 34d of each set may be disposed within a common housing, such as a single enclosure. Alternatively, the router transceiver units 34a, 34b, 34c, 34d of each set may be disposed within different housings. A shared power source 144 disposed on-board one or more of the vehicles 18a, 18b may provide electrical energy to power the router transceiver units 34a, 34b, 34c, 34d. Examples of power sources 144 may include generators or alternators connected to a diesel engine (with one or more transformers, rectifiers, and the like, disposed between the generator or alternator and the router transceiver units 34a, 34b, 34c, 34d), rechargeable batteries, and the like. A single power source 144 may power each of the router transceiver sets. Alternatively, multiple, redundant power sources 144 may power each router transceiver set. In the illustrated embodiment, a single conductive pathway 146 (e.g., one or more wires, cables, buses, or the like conductively coupled with each other) supplies electrical energy from the power source 144 to the router transceiver set. Alternatively, multiple conductive pathways 146 may supply the electrical energy. For example, two or more separate sets of wires, cables, buses, or the like, may extend from the power source 144 to the router transceiver units 34a, 34b, 34c, 34d in each set. The additional conductive pathways 146 can provide redundancy in the power supply to the router transceiver sets.

As described above, the MU cable bus 26 includes several elongated conductive pathways 120 that extend along the length of the MU cable bus 26 from the first vehicle 18a to the second vehicle 18b. While only four conductive pathways 120 are shown in FIG. 13, the MU cable bus 26 may include more or fewer conductive pathways 120. A subset, or less than all, of the conductive pathways 120 in the MU cable bus 26 may be used for communication of network data 16, while other conductive pathways 120 are used for communication of non-network data.

The conductive pathways 120 define physical portions of the MU cable bus 26 over which network data and/or non-network data can be communicated between the first vehicle 18a and the second vehicle 18b. In one embodiment, the conductive pathways 120 are conductive wires that are not conductively coupled with each other within the MU cable bus 26. For example, the conductive pathways 120 may not transmit electric signals such as network data or non-network data between the conductive pathways 120 within the MU cable bus 26. The conductive pathways 120 may be individually surrounded by dielectric jackets to prevent signals transmitted along a first conductive pathway 120 from being conducted to a different second conductive pathway 120 within the MU cable bus 26.

Different or distinct physical portions of the MU cable bus 26 may include different conductive pathways 120 or different, non-overlapping sets of conductive pathways 120. For example, a first wire or set of wires may be a first physical portion of the MU cable bus 26 and a second, different wire that is not conductively coupled with the first wire or a second set of wires that does not share any wires with the first set of wires may be a second, distinct physical portion of the MU cable bus 26.

In operation, if either of the router transceiver pairs 132, 134 enters a failure condition for being unable to transmit and/or receive network data 16 over the MU cable bus 26, and/or if any one of the first, second, third, and fourth router transceiver units 34a, 34b, 34c, 34d enters the failure condition and is unable to communicate network data 16 over the MU cable bus 26, then the other router transceiver pair 132, 134 and/or remaining router transceiver units 34a, 34b, 34c, 34d that are not in the failure condition can continue to transmit the network data 16 over the MU cable bus 26. ("Failure condition," as indicated, means being unable to transmit and/or receive network data 16 over the MU cable bus 26.)

To explain further, according to one aspect, in a configuration such as shown in FIG. 1 (for example), if either of the router transceiver units 34a, 34b enters a failure condition, then network communications may no longer be possible between the two vehicles 18a, 18b through or over the MU cable bus 26 using the router transceiver units 34a, 34b. However, in the system 130 as illustrated in FIGS. 13-15, the redundant router transceiver pair 134 can act as a functional backup to the first router transceiver pair 132, if either or both of the router transceiver units 34a, 34b in the first router transceiver pair 132 fails or is otherwise unable to successfully communicate the network data 16 through the MU cable bus 26 between the first and second vehicles 18a, 18b. (Conversely, the first router transceiver pair 132 may act as a functional backup to the redundant router transceiver pair 134 should the redundant transceiver pair 134 fail.) In particular, from a system level view, (i) if either of the router transceiver pairs 132 or 134 enters a failure condition, then the other router transceiver pair 132 or 134 carries on for network data transmission through the MU cable bus 26 and between the vehicles 18a, 18b, and/or (ii) if any one of the router transceiver units 34a, 34b, 34c, or 34d enters a failure condition, then at least two of the other, functional router transceiver units 34a, 34b, 34c, 34d may continue to transmit network data 16 across the MU cable bus 26 between the first and second vehicles 18a, 18b.

As described below, the first transceiver pair 132 and the redundant transceiver pair 134 may be arranged in different network groups. For example, the first and second router transceiver units 34a, 34b may be members of a first network group and the third and fourth router transceiver units 34c, 34d may be members of a different, second network group. A network group can include members that are able to communicate with each other through a network or common medium, such as the MU cable bus 26. In one embodiment, the network groups do not communicate between each other. For example, a member of a first network group does not communicate with a member of a different, second network group. Alternatively, members of different network groups may be able to communicate with each other.

The members of a network group may be defined based on unique addresses associated with the members. For example, router transceiver units 34 of a first network may have unique addresses that are associated with the first network while router transceiver units 34 of a different, second network have unique addresses that are associated with the second network. Alternatively, the router transceiver units 34 of each network may have addresses that are common to members of the network group, but differ from the addresses of members in other network groups.

The addresses may be used to enable communication between members of the same network group while avoiding communication between members of different groups when the MU cable bus 26 is used by multiple network groups for communication. For example, one or more packets of the network data 16 sent from a first member to a second member of the same network group may include a header field having the address of the second member. The network data 16 may be ignored or disregarded by members other than the second member but received by the second member due to the address associated with the network data 16.

In one embodiment, multiple, different network groups can use the same physical portions of the MU cable bus 26 to communicate. For example, the members of a first network group may communicate with each other over a set of conductive pathways 120 in the MU cable bus 26 and members of a different, second network group may communicate with each other over the same set of conductive pathways 120, without communications among the first network group being received by the second network group, and vice-versa. Alternatively, different network groups may use different physical portions of the MU cable bus 26 to communicate. For example, the members of the first network group may communicate with each other over a first set of conductive pathways 120 in the MU cable bus 26 while members of the second network group communicate with each other over a different, distinct, and non-overlapping set of conductive pathways 120.

FIG. 13 shows a first configuration of the system 130. Here, the first router transceiver pair 132 and the second, redundant router transceiver pair 134 are configured in different network groups, i.e., they are part of different networks or sub-networks. As shown in FIG. 13, the first and second router transceiver units 34a, 34b belong to a first network group and are provided with a label of "NET GROUP #1." The third and fourth router transceiver units 34c, 34d belong to a different, second network group and are provided with a label of "NET GROUP #2." These labels represent the network groups by identifying the members of each network group.

In addition to being in different network groups, the first and second router transceiver units 34a, 34b of the first router transceiver pair 132 communicate over a first physical portion 136 of the MU cable bus 26, and the third and fourth router transceiver units 34c, 34d of the second router transceiver pair 134 communicate over a second, distinct physical portion 138 of the MU cable bus 26. The distinct physical portions 136, 138 can include different, non-overlapping sets of conductive pathways 120 of the MU cable bus 26. For example, none of the conductive pathways 120 in the first physical portion 136 may be included in the second physical portion 138, and vice-versa. Thus, the router transceiver units 34a, 34b of the first router transceiver pair 132 and the first network may communicate over a first wire (or set of wires) of the MU cable bus 26, and the router transceiver units 34c, 34d of the second router transceiver pair 134 and the second network may communicate over a second, different wire (or set of wires) of the MU cable bus 26. In one embodiment, "distinct" means the router transceiver units 34a, 34b of the first router transceiver pair 132 does not transmit over any of the conductive pathways 120 of the second router transceiver pair 134, and vice-versa. The router transceiver units 34a, 34b, 34c, 34d are connected to electronic components 32 of the vehicles 18a, 18b, as described above.

The system 130 may be configured for operation in different ways. In a first way, the first router transceiver pair 132 is used for network data 16 communications until and unless one or both of the router transceiver units 34a, 34b enters a failure condition, in which case the router transceiver units 34c, 34d of the other router transceiver pair 134 are used for network data 16 communication. One or more of the first and second vehicles 18a, 18b can include a monitor module 142 that is communicatively coupled with one or more of the router transceiver units 34a, 34b, 34c, 34d in the corresponding vehicle 18a, 18b. The monitor module 142 includes fault detection circuitry, such as one or more computer processors, microprocessors, controllers, microcontrollers, or other logic-based devices, that monitor the health of the router transceiver units 34a, 34b, 34c, 34d. The monitor module 142 can monitor the health of the router transceiver units 34a, 34b, 34c, 34d using standard computer networking equipment and/or methods. The monitor module 142 may be included in the control module 174 in one embodiment.

For example, the monitor module 142 may monitor the transmission and/or receipt of network data 16 from and/or to the various router transceiver units 34a, 34b, 34c, 34d. If one or more of the router transceiver units 34a, 34b, 34c, 34d stops or transmitting network data 16 (such as by transmitting incorrect signals without network data 16, transmitting network data 16 during an incorrect time slot, or transmitting network data 16 using an incorrect frequency, for example) or significantly decreases the rate at which network data 16 is transmitted, then the monitor module 142 may identify the one or more router transceiver units 34a, 34b, 34c, 34d as being in a failure condition. The monitor module 142 may notify the control module 174 which of the router transceiver pairs 132, 134 includes the router transceiver unit 34a, 34b, 34c, 34d in the failure condition and/or notify the control module 174 which router transceiver unit 34a, 34b, 34c, 34d is in the failure condition. The control module 174 can then cause the router transceiver units 34a, 34b, 34c, 34d of the other router transceiver pair 132 or 134 to take over or control communication of network data 16 through the MU cable bus 26. For example, the control module 174 may direct the switch module 172 to allow the router transceiver pair 132, 134 that does not include the router transceiver unit 34a, 34b, 34c, 34d in the failure condition to take over or control communication of the network data 16.

In one embodiment, if the first transceiver pair 132 is communicating network data 16 over the MU cable bus 26 and the second transceiver pair 134 is not transmitting network data 16, and the monitor module 142 determines that the router transceiver unit 34a or 34b of the first router transceiver pair 132 enters the failure condition, then the control module 174 may direct the switch module 172 to allow the third and fourth router transceiver units 34c, 34d of the second router transceiver pair 134 to take over communication of the network data 16. For example, the control module 174 may direct the switch module 172 to change states to allow the second router transceiver pair 134 to communicate the network data 16 and to prevent the first router transceiver pair 132 from communicating or attempting to communicate the network data 16. The second router transceiver pair 134 may take over in place of the first router transceiver pair 132.

In a second way, both router transceiver pairs 132, 134 may be concurrently used as redundant networks, with both router transceiver pairs 132, 134 communicating network data 16 over the MU cable bus 26 at the same time or during overlapping time periods. In such a case, if the control module 174 determines that either of the router transceiver pairs 132, 134 enters a failure condition based on feedback from the monitor module 142, then the control module 174 may direct the switch module 172 to cause the other of the router transceiver pairs 132, 134 may take over communication of the network data 16 on behalf of the router transceiver pair 132, 134 in the failure condition. For example, instead of both router transceiver pairs 132, 134 communicating the network data 16, the router transceiver pair 132, 134 that is not in the failure condition may communicate all of the network data 16.

By communicating over distinct physical portions 136, 138 of the MU cable bus 26, if one of the physical portions 136, 138 should fail, then communication of the network data 16 may continue over the other physical portion 136, 138. For example, if the physical portion 136 or 138 is mechanically damaged, such as by being cut or electrically shorted to another conductive pathway 120, then the other physical portion 136 or 138 may be used for continued communication of the network data 16. The monitor module 142 may identify a failure condition when the physical portion 136 or 138 is damaged due to the inability of the router transceiver units 34a, 34b, 34c, 34d that are coupled to the damaged physical portion 136 or 138 to communicate the network data 16. The use of different physical portions 136, 138 (e.g., two wires for each portion 136, 138) and different network groups (e.g., separate network addresses for the router transceiver units 34a, 34b, 34c, 34d), the amount of available bandwidth to communicate the network data 16 via the MU cable bus 26 is increased.

FIG. 14 shows a second configuration of the system 130. In the illustrated embodiment, the first router transceiver pair 132 and the second, redundant router transceiver pair 134 are configured in different network groups, similar to the embodiment shown in FIG. 13. However, instead of communicating over distinct physical portions 136, 138 (shown in FIG. 13) of the MU cable bus 26, the router transceiver pairs 132, 134 communicate over the same physical portion 136, or a common physical portion 136 of the MU cable bus 26. For example, both the router transceiver pairs 132, 134 may communicate between the vehicles 18a, 18b and over the MU cable bus 26 using one or more of the same conductive pathways 120.

In one embodiment, only one of the router transceiver pairs 132, 134 communicates the network data 16 at a time. For example, the first router transceiver pair 132 may communicate the network data 16 until the first router transceiver pair 132 enters a failure condition, at which point the redundant router transceiver pair 134 communicates the network data 16. Alternatively, the router transceiver pairs 132, 134 may concurrently communicate network data 16 between the vehicles 18a, 18b.

If the router transceiver pairs 132, 134 concurrently communicate network data 16 over the common physical portion 136 of the MU cable bus 26 (e.g., by transmitting the network data 16 at the same time or during at least partially overlapping time periods), different communication channels may be used by the first and second router transceiver units 132, 134. For example, the router transceiver pairs 132, 134 may coordinate the communication of network data 16 over the common portion 136 by using different communication channels. The control module 174 may direct the router transceiver pairs 132, 134 to use different channels. A communication channel can mean different frequencies, different bandwidths, different time slots in a Time Division Multiple Access (TDMA) method, different codes in a Code Division Multiple Access (CDMA) method, and the like. For example, the router transceiver pairs 132, 134 may be assigned different portions of the bandwidth available on the MU cable bus 26. Each router transceiver pair 132, 134 may only use the bandwidth that is assigned to that router transceiver pair 132, 134. As another example, the control module 174 may assign different frequency bands available on the MU cable bus 26 to the router transceiver pairs 132, 134. The MU cable bus 26 may have a limited frequency spectrum that is usable for transmitting the network data 16 (e.g., up to 30 MHz). Different frequency bands (e.g., different frequencies or different ranges of frequency in the available frequency spectrum) may be assigned to different router transceiver pairs 132, 134. In one embodiment, the first router transceiver pair 132 may be assigned the frequencies up to 15 MHz while the second router transceiver pair 134 may be assigned the frequencies from 15 MHz to 30 MHz.

Using the different channels can allow the router transceiver pairs 132, 134 to communicate the network data 16 on the same portion 136 of the MU cable bus 26 while reducing or avoiding interference between the network data 16 communicated by the different router transceiver pairs 132, 134. Each of the router transceiver pairs 132, 134 may be provided with information about the communication channel used by the other router transceiver pair 132, 134 in order to avoid communications conflicts. If the router transceiver pairs 132, 134 are not used concurrently (e.g., if one router transceiver pair 132 is used unless and until the router transceiver pair 132 enters a failure condition), then the router transceiver pairs 132, 134 may use the same communication channel.

In one embodiment, if the monitor module 174 determines that the router transceiver unit 34 in one of the sets of router transceiver units 34 disposed on a common vehicle 18a or 18b enters a failure condition, then the control module 174 may direct the other router transceiver unit 34 in the same set to take over communication of the network data 16. For example, if the router transceiver units 34a and 34b are communicating network data 16 in a first network group and the router transceiver unit 34a enters a failure condition, then the control module 174 can direct the switch module 172 to allow the router transceiver unit 34c in the same set of router transceiver units 34 on the first vehicle 18a to communicate the network data 16 with the router transceiver unit 34b on the second vehicle 18b. The control module 174 can direct the third router transceiver unit 34c in the second network group to communicate the network data 16 with the second router transceiver unit 34b in the first network group. Similarly, the control module 174 can direct the second router transceiver unit 34b in the first network group to communicate the network data 16 with the third router transceiver unit 34c in the second network group.

In another embodiment, if router transceiver units 34 on different vehicles 18a, 18b and in each router transceiver pair 132, 134 enter a failure condition, then the remaining router transceiver units 34 may communicate the network data 16 with each other. For example, the first router transceiver unit 34a on the first vehicle 18a may communicate network data 16 with the second router transceiver unit 34b on the second vehicle 18b using a first channel (e.g., a first frequency band or range of frequencies). The third router transceiver unit 34c on the first vehicle 18a may communicate network data 16 with the fourth router transceiver unit 34d on the second vehicle 18b using a different, second channel (e.g., a second frequency band or range of frequencies that differs and/or does not overlap with the first frequency band or range). If the second router transceiver unit 34b in the first router transceiver pair 132 and on the first vehicle 18a enters a failure condition and the third router transceiver unit 34c on the second vehicle 18b and in the second router transceiver pair 134 enters a failure condition, then the first router transceiver unit 34a and the fourth router transceiver units 34d may take over communication of the network data 16. For example, the first and fourth router transceiver units 34a, 34d may communicate the network data 16 using the first channel, the second channel, or a combination of the first and second channels (e.g., a frequency band or range than encompasses both the first and second frequency bands or ranges).

FIG. 15 shows a third configuration of the system 130. In the illustrated embodiment, the first router transceiver pair 132 and the second router transceiver pair 134 are configured in the same network group (e.g., "Net Group #1"). For example, the router transceiver units 34a, 34b, 34c, 34d may all be assigned or associated with addresses that belong to the same network group. Additionally, the first and second router transceiver units 34a, 34b of the first router transceiver pair 132 and the third and fourth router transceiver units 34c, 34d of the second router transceiver pair 134 communicate network data 16 over the same physical portion 136 of the MU cable bus 26. For example, the first router transceiver pair 132 may communicate network data 16 between the vehicles 18a, 18b through the conductive pathways 120 of the physical portion 136 and the second router transceiver pair 134 may communicate network data 16 between the vehicles 18a, 18b through one or more of the same conductive pathways 120 of the physical portion 136.

In a first possible mode of operation, the first router transceiver pair 132 is used to communicate network data 16 over the MU cable bus 26 until and unless one of the router transceiver units 34a, 34b of the enters a failure condition. If one of the router transceiver units 34a, 34b enters a failure condition, then another, redundant router transceiver unit 34c, 34d of the redundant router transceiver pair 134 may be used to continue communicating the network data 16. For example, if the first router transceiver unit 34a in the first vehicle 18a is communicating network data 16 with the second router transceiver unit 34b in the second vehicle 18b and the first router transceiver unit 34a fails, then the third router transceiver unit 34c in the same router transceiver set disposed on the same vehicle 18a as the failed first router transceiver unit 34a can take over for the first router transceiver unit 34a. For example, the third router transceiver unit 34c can continue to communicate network data 16 with the second router transceiver unit 34b on the second vehicle 18b. In another example, if the router transceiver unit 34b on the second vehicle 18b fails, then the other router transceiver unit 34d in the same router transceiver set on the second vehicle 18b as the second router transceiver unit 34b can take over and communicate the network data 16 with the first or third router transceiver unit 34a, 34c on the first vehicle 18a.

In another possible mode of operation, the router transceiver units 34a, 34b, 34c, 34d operate concurrently. For example, network data 16 is presented at the router transceiver units 34a, 34c on the first vehicle 18a and each of the router transceiver units 34a, 34c transmits the network data 16 over one or more of the same conductive pathways 120 in the same physical portion 136 of the MU cable bus 26 to the router transceiver units 34b, 34d on the second vehicle 18b. The network data 16 may then be communicated to downstream electronic components 32 of the second vehicle 18b. The term "concurrently" does not mean that data is necessarily communicated at exactly the same time, but rather that the router transceiver units are operating concurrently for data transmission consistent with network architecture and logic. For example, the router transceiver units 34a, 34c or the router transceiver units 34b, 34d that are disposed on the same vehicle 18a or 18b may communicate packets of the network data 16 over time periods that at least partially overlap. As described above, interference between concurrently transmitted network data 16 can be avoided or significantly reduced by allocating different channels (e.g., different bandwidths, different frequencies, different time slots, and the like) to the different router transceiver units 34a, 34b, 34c, 34d.

In one embodiment, if the router transceiver unit 34 in one of the sets of router transceiver units 34 disposed on a common vehicle 18a or 18b enters a failure condition, then the control module 174 may direct the other router transceiver unit 34 in the same set to take over communication of the network data 16. For example, if the router transceiver units 34a and 34b are communicating network data 16 and the router transceiver unit 34a enters a failure condition, then the control module 174 can direct the router transceiver unit 34c in the same set of router transceiver units 34 on the first vehicle 18a to communicate the network data 16 with the router transceiver unit 34b on the second vehicle 18b. The control module 174 can direct the third router transceiver unit 34c to communicate the network data 16 with the second router transceiver unit 34b. Similarly, the control module 174 can direct the second router transceiver unit 34b to communicate the network data 16 with the third router transceiver unit 34c.

Figure 16:
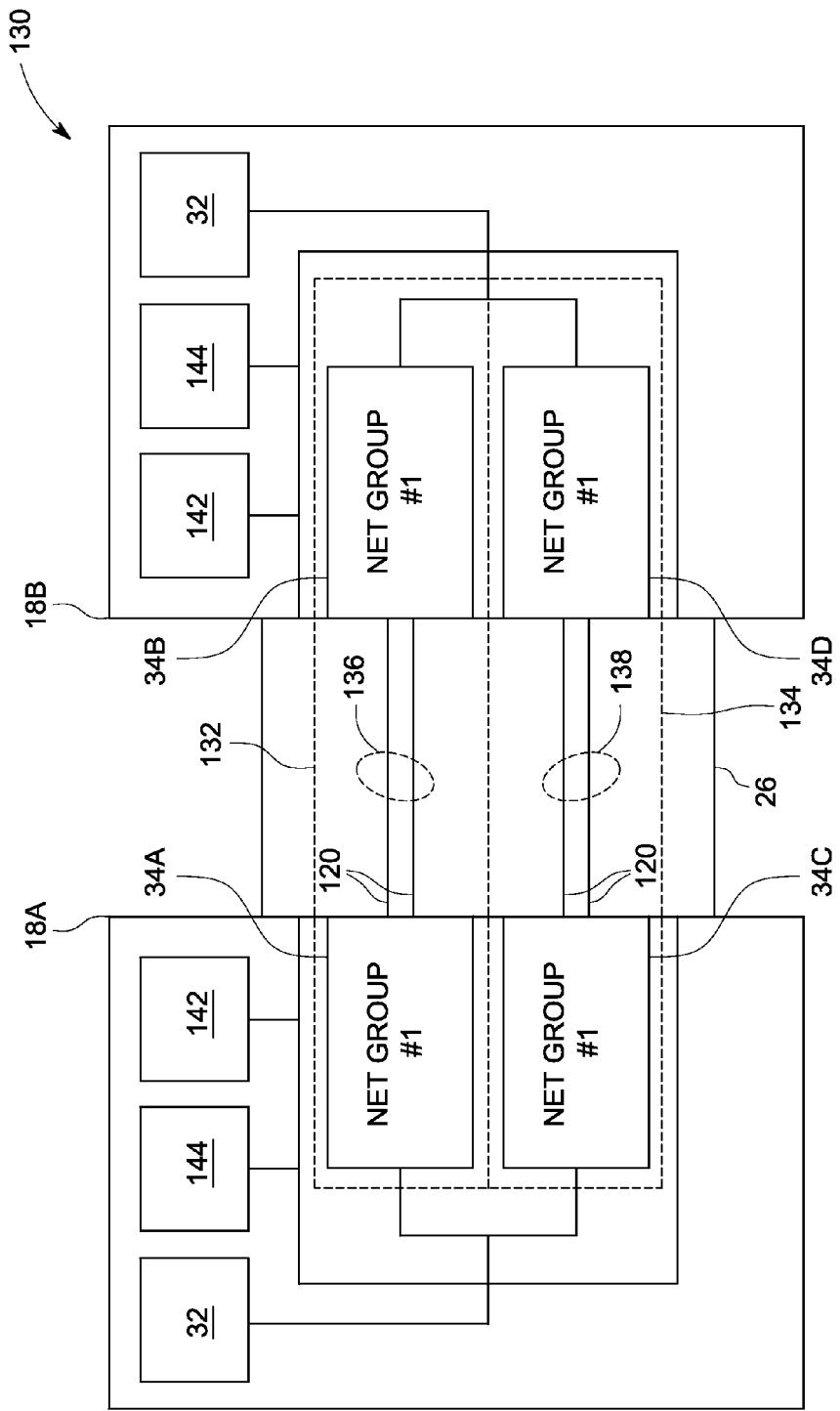

FIG. 16 shows another configuration of the system 130. In the illustrated embodiment, the first router transceiver pair 132 and the second router transceiver pair 134 are configured in the same network group (e.g., "Net Group #1"), but communicate over different physical portions 136, 138 of the MU cable bus 26. For example, the first and third router transceiver units 34a, 34c communicate network data 16 between each other over the conductive pathways 120 of the first physical portion 136 of the MU cable bus 26 while the second and fourth router transceiver units 34b, 34d communicate network data 16 between each other over the conductive pathways 120 of the distinct, second physical portion 136 of the MU cable bus 26. The network data 16 can be communicated concurrently by the router transceiver pairs 132, 134, or one of the router transceiver pairs 132 may serve as a primary communicator of the network data 16 until entering a failure condition, at which point the other router transceiver pair 134 can take over communication of the network data 16.

In the illustrated embodiment, the first router transceiver pair 132 and the second router transceiver pair 134 are configured in the same network group (e.g., "Net Group #1"). For example, the router transceiver units 34a, 34b, 34c, 34d may all be assigned or associated with addresses that belong to the same network group. Additionally, the first and second router transceiver units 34a, 34b of the first router transceiver pair 132 and the third and fourth router transceiver units 34c, 34d of the second router transceiver pair 134 communicate network data 16 over the same physical portion 136 of the MU cable bus 26. For example, the first router transceiver pair 132 may communicate network data 16 between the vehicles 18a, 18b through the conductive pathways 120 of the physical portion 136 and the second router transceiver pair 134 may communicate network data 16 between the vehicles 18a, 18b through one or more of the same conductive pathways 120 of the physical portion 136.

In any configurations of the system 130, the router transceiver units and/or electronic components may be provided with standard network switching and routing functionality, and/or additional switches and/or routers may be provided, to effectuate the orderly transmission of data in manner described. In the embodiments of FIGS. 13 and 14, each electronic component may be provided with two network addresses for communications across the different network groups.

Figure 17:
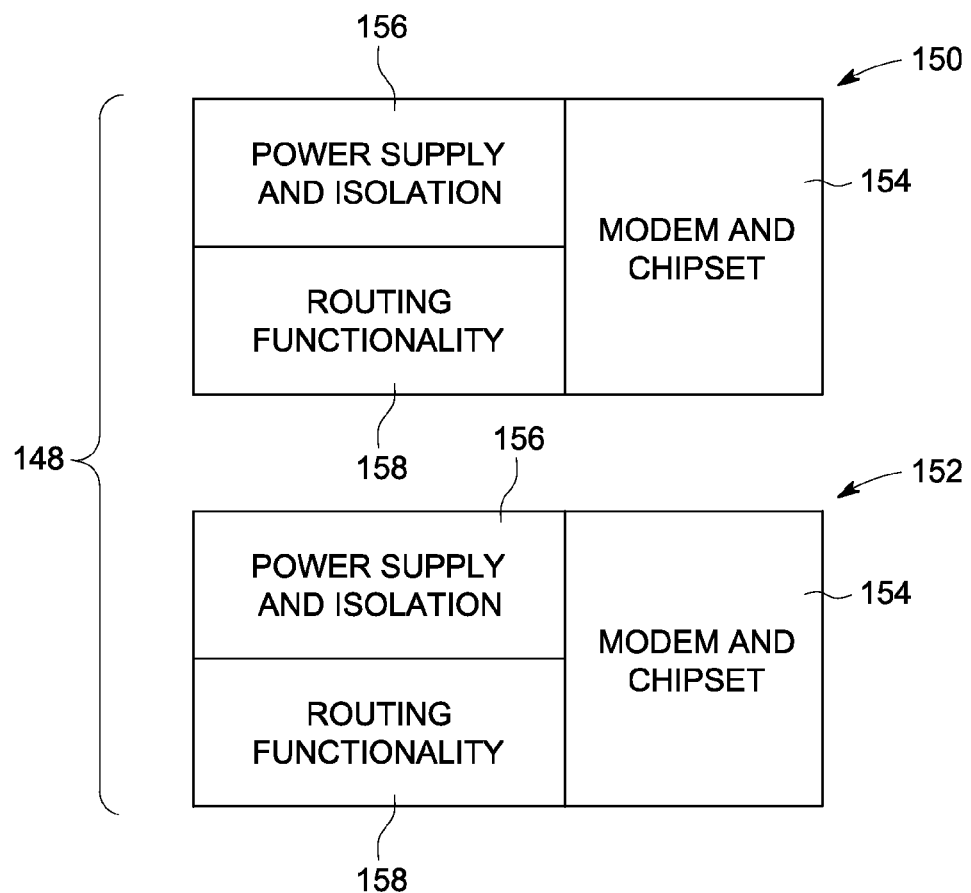
FIGS. 17-19 are schematic diagrams of different sets of router transceiver units disposed on-board a vehicle in accordance with various embodiment.

FIG. 17 is a schematic diagram of a set 148 of router transceiver units 150, 152 disposed on-board the same vehicle 18 in accordance with one embodiment. The router transceiver units 150, 152 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 150, 152 are redundant units. For example, each of the router transceiver units 150, 152 includes a modem and chipset component 154, a power supply and isolation component 156, and routing circuitry 158 ("routing functionality"). The modem and chipset component 154 includes circuitry that is conductively coupled with the MU cable bus 26. The modem and chipset component 154 modulates data to be transmitted as the network data 16 on the MU cable bus 26 and demodulates network data 16 that is received from the MU cable bus 26. The power supply and isolation component 156 includes circuitry that receives electric energy from the power source 144 and conveys the electric energy to the other components of the router transceiver units 150, 152 to power the components. The routing circuitry 158 receives the data that is demodulated from the network data 16 by the modem and chipset component 154 and communicates the demodulated data to one or more of the electronic components 32 disposed on-board the same vehicle 18 as the set 148 of the router transceiver units 150, 152.

Figure 18:
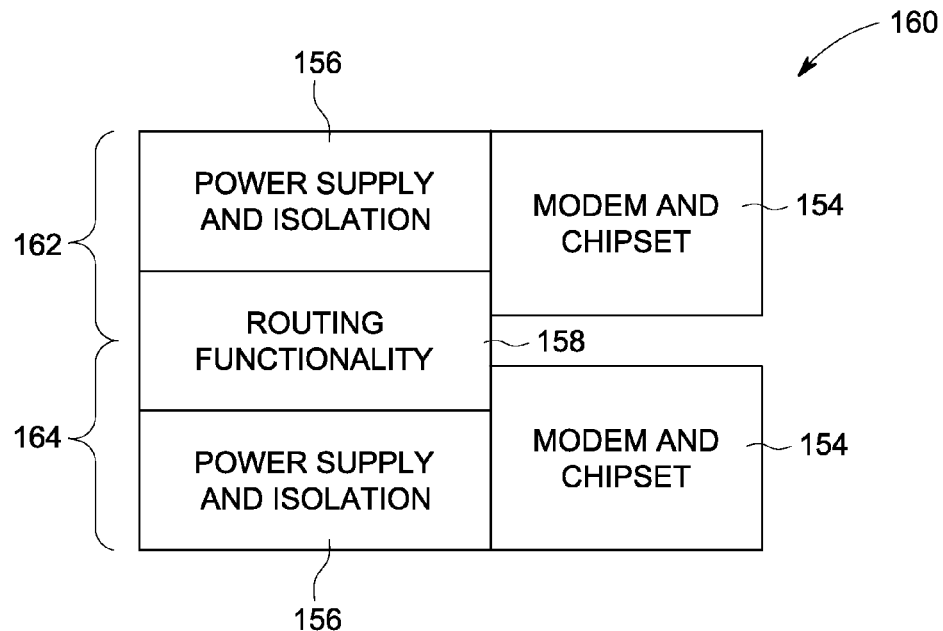

FIG. 18 is a schematic diagram of a set 160 of router transceiver units 162, 164 disposed on-board the same vehicle 18 in accordance with another embodiment. The router transceiver units 162, 164 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 162, 164 are partially redundant units. For example, each of the router transceiver units 162, 164 includes a separate modem and chipset component 154 and a separate power supply and isolation component 156. The routing circuitry 158 is shared by the router transceiver units 162, 164. For example, the router transceiver units 162, 164 may use the same circuitry and conductive pathways of the routing circuitry 158 to direct demodulated data from the network data 16 to one or more components 32 on the same vehicle 18 as the set 160.

Figure 19:
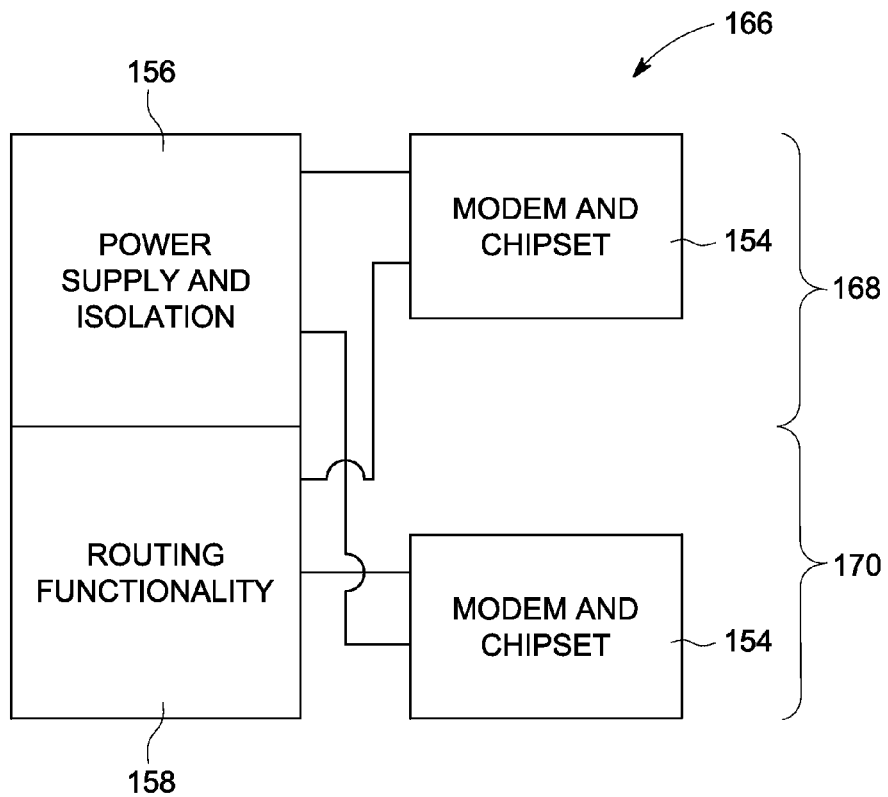

FIG. 19 is a schematic diagram of a set 166 of router transceiver units 168, 170 disposed on-board the same vehicle 18 in accordance with another embodiment. The router transceiver units 168, 170 may represent the router transceiver units disposed on the same vehicle 18a or 18b, such as the router transceiver units 34a, 34c on the first vehicle 18a or the router transceiver units 34b, 34d on the second vehicle 18b.

In the illustrated embodiment, the router transceiver units 168, 170 are partially redundant units. For example, each of the router transceiver units 168, 170 includes a separate modem and chipset component 154. The power supply and isolation component 156 and the routing circuitry 158 are shared by the router transceiver units 168, 170. For example, the router transceiver units 168, 170 may use the same circuitry and conductive pathways of the routing circuitry 158 to direct demodulated data from the network data 16 to one or more components 32 on the same vehicle 18 as the set 160. The router transceiver units 168, 170 may use the same circuitry and conductive pathways of the power supply and isolation component 156 to receive power from the power supply 144. For example, the power supply and isolation component 156 may direct the electric current from the power supply 144 to both modem and chipset components 154.

Figure 20:
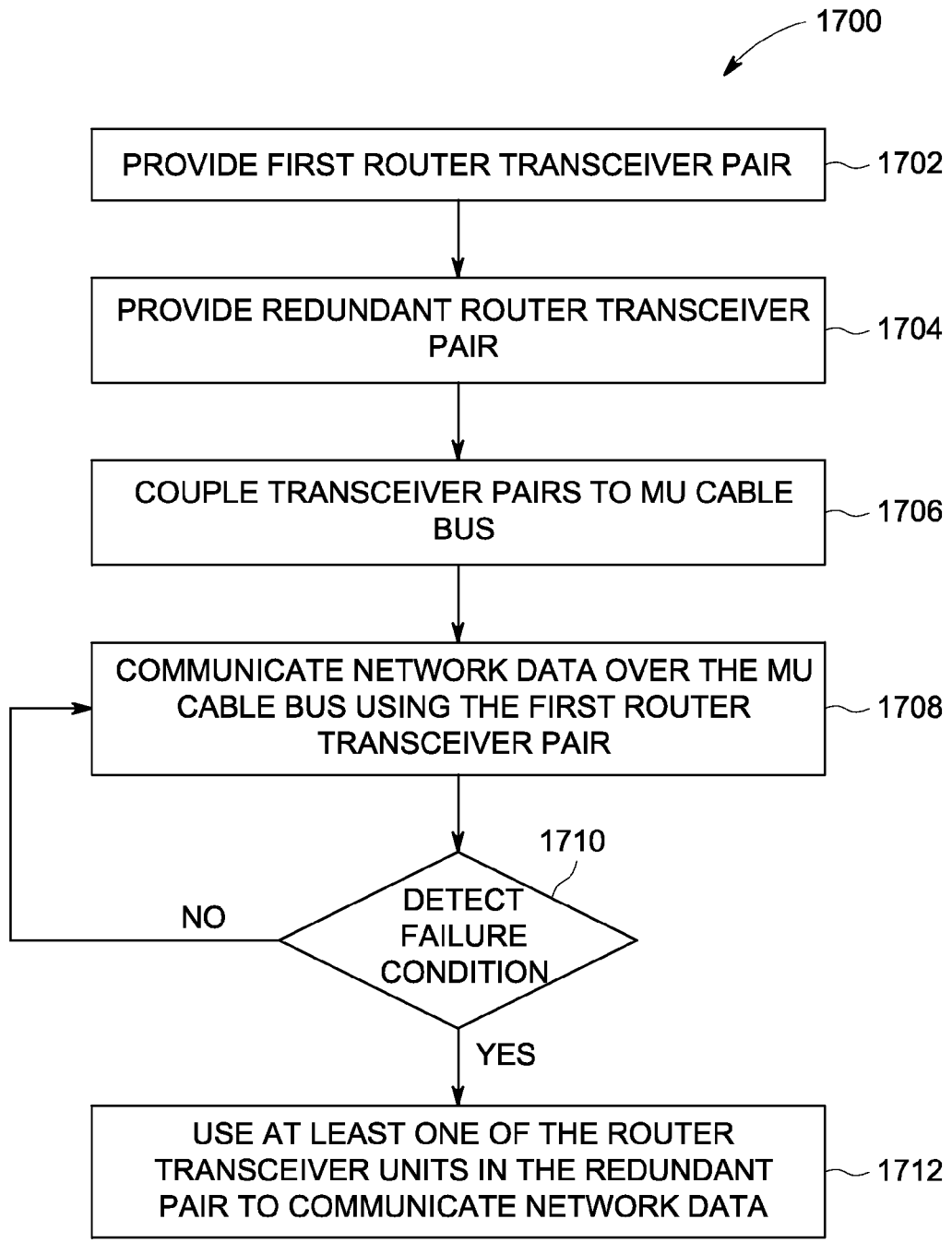
FIG. 20 is a flowchart of a method for communicating data in a vehicle consist in accordance with one embodiment.

FIG. 20 is a flowchart of a method 1700 for communicating data in a vehicle consist in accordance with one embodiment.

The method 1700 may be used in conjunction with one or more of the embodiments shown and described in connection with FIGS. 13 through 16.

At 1702, a first router transceiver pair is provided in a vehicle consist. For example, the first router transceiver pair 132 may be provided by placing the first router transceiver unit 34a on the first vehicle 18a and the second router transceiver unit 34b on the second vehicle 18b. The router transceiver units 34a, 34b can be coupled with one or more electronic components 32 on the first and/or second vehicles 18a 18b.

At 1704, a redundant router transceiver pair is provided in the vehicle consist. For example, the redundant router transceiver pair 134 may be provided by placing the third router transceiver unit 34c on the first vehicle 18a and the fourth router transceiver unit 34d on the second vehicle 18b. The router transceiver units 34c, 34d can be coupled with one or more of the electronic components 32 on the first and/or second vehicles 18a, 18b.

At 1706, the router transceiver pairs are conductively coupled with an MU cable bus that extends between and interconnects the first and second vehicles of the consist. For example, the first router transceiver unit 34a of the first router transceiver pair 132 and the third router transceiver unit 34c of the redundant router transceiver pair 134 in the first vehicle 18a can be coupled to the MU cable bus 26. The second router transceiver unit 34b of the first router transceiver pair 132 and the fourth router transceiver unit 34d of the redundant router transceiver pair 134 in the second vehicle 18b can be coupled to the MU cable bus 26. In one embodiment, the router transceiver pairs 132, 134 are coupled with different physical portions 136, 138 of the MU cable bus 26, as described above. Alternatively, the router transceiver pairs 132, 134 can be coupled with the same or a common physical portion 136 or 138 of the MU cable bus 26, also as described above.

At 1708, network data is communicated between the first and second vehicles of the consist using the first router transceiver pair through the MU cable bus. For example, the first router transceiver unit 34a on the first vehicle 18a can communicate network data 16 to the second router transceiver unit 34b on the second vehicle 18b. Alternatively, a different combination of router transceiver units may be used to communicate network data between the vehicles. For example, at least one of the router transceiver units 34a, 34c on the first vehicle 18a can communicate network data 16 with at least one of the router transceiver units 34b, 34d on the second vehicle 18b.

At 1710, a determination is made as to whether one or more of the router transceiver units is in a failure condition. For example, the monitor module 142 on one or more of the vehicles 18a, 18b may determine if one or more of the router transceiver units 34a, 34b, 34c, 34d is unable to communicate the network data 16. If one or more of the router transceiver units 34a, 34b that is communicating the network data 16 enters the failure condition, then the first transceiver unit may be unable to continue communicating the network data 16. As a result, flow of the method 1700 proceeds to 1712. On the other hand, if the first transceiver pair 132 is not in the failure condition and is able to continue communicating the network data 16, then flow of the method 1700 may return to 1708, where the first transceiver router pair 132 continues to communicate the network data 16.

At 1712, at least one of the router transceiver units of the redundant router transceiver pair that is not in the failure condition is used to communicate the network data. For example, if the first router transceiver unit 34a is in the failure condition, then the third router transceiver unit 34c on the same vehicle 18a may take over communication of the network data 16 to and from the vehicle 18a. As another example, if the second router transceiver unit 34b is in the failure condition, then the fourth router transceiver unit 34d on the same vehicle 18b may take over communication of the network data 16 to and from the vehicle 18b.

In one embodiment, a communication system for a vehicle consist is provided. The system includes a control module that is configured to interface with at least one of a first router transceiver pair or a redundant router transceiver pair. Each of the router transceiver pairs is configured to communicate network data between vehicles of the consist over a cable bus of the vehicle consist. The control module includes a monitor module and a switch module. The monitor module monitors operation of at least one of the first router transceiver pair or the redundant router transceiver pair. The switch module is operably coupled with the monitor module and is configured to control the first router transceiver pair or the redundant router transceiver pair to communicate the network data over the cable bus if the other of the first router transceiver pair or the redundant router transceiver pair enters a failure condition for being unable to communicate the network data over the cable bus, as determined by the monitor module.

In another aspect, the control module controls the first router transceiver pair to communicate the network data in a first network group and the redundant router transceiver pair to communicate the network data in a different, second network group.

In another aspect, the cable bus (e.g., an MU cable bus) comprises a plurality of conductive pathways that are not conductively coupled with each other within the cable bus. The control module can direct the first router transceiver pair to communicate the network data over a first subset of the conductive pathways and the redundant router transceiver pair to communicate the network data over a distinct, second subset of the conductive pathways.

In another aspect, the cable bus comprises a plurality of conductive pathways that are not conductively coupled with each other within the cable bus. The control module can direct the first router transceiver pair and the redundant router transceiver pair to communicate the network data over a common portion of the conductive pathways.

In another aspect, the control module controls the first router transceiver pair to communicate the network data in a first network group and the redundant router transceiver pair to communicate the network data in the same first network group.

In another aspect, the cable bus comprises a plurality of conductive pathways that are not conductively coupled with each other within the cable bus. The control module can direct the first router transceiver pair to communicate the network data over a first subset of the conductive pathways and the redundant router transceiver pair to communicate the network data over a distinct, second subset of the conductive pathways.

In another aspect, the cable bus comprises a plurality of conductive pathways that are not conductively coupled with each other within the cable bus. The control module can direct the first router transceiver pair and the redundant router transceiver pair to communicate the network data over a common portion of the conductive pathways.

In another aspect, the control module directs the first router transceiver pair to communicate the network data using a first communication channel and the redundant router transceiver pair to communicate the network data using a second, different communication channel.

In another aspect, the first router transceiver pair includes a first router transceiver unit in a first vehicle and a second router transceiver unit in a different, second vehicle. The redundant router transceiver pair includes a third router transceiver unit in the first vehicle and a fourth router transceiver unit in the second vehicle. The system may also include a shared power supply conductive pathway delivering electrical energy from a power supply to the first router transceiver unit and the third router transceiver unit in the first vehicle.

In another embodiment, a communication method includes monitoring a first router transceiver pair and a redundant router transceiver pair. The first router transceiver pair includes a first router transceiver unit disposed on a first vehicle of a vehicle consist and a second router transceiver unit disposed on a different, second vehicle of the vehicle consist. The redundant router transceiver pair includes a third router transceiver unit disposed on the first vehicle and a fourth router transceiver unit disposed on the second vehicle. The first router transceiver pair and the redundant router transceiver pair are configured to communicate network data over a cable bus that extends through the vehicle consist. The method also includes determining that one of the first router transceiver pair or the redundant router transceiver pair has entered a failure condition for being unable to communicate the network data over the cable bus and subsequent said determination, controlling the other of the first router transceiver pair or the redundant router transceiver pair to communicate the network data over the cable bus.

In another aspect, the monitoring step includes monitoring communication of the network data by at least one of the first router transceiver pair or the redundant router transceiver pair over a common portion of the cable bus.

In another aspect, the monitoring step includes monitoring communication of the network data by the first router transceiver pair over a first portion of the cable bus and monitoring communication of the network data by the redundant router transceiver pair over a distinct, second portion of the cable bus.

In another aspect, the monitoring step includes monitoring communication of the network data in a first network group of the first router transceiver pair and monitoring communication of the network data in a different, second network group of the redundant router transceiver pair.

In another aspect, the monitoring step includes monitoring communication of the network data in a network group of the first router transceiver pair and monitoring communication of the network data in the same network group of the redundant router transceiver pair.

In another embodiment, another communication system is provided. The system includes a first router transceiver unit and a redundant router transceiver unit. Each of the first router transceiver unit and the redundant router transceiver unit is configured to be coupled to a cable bus of a vehicle for communicating network data over the cable bus. Each of the first router transceiver unit and the redundant router transceiver unit is configured for one of the first router transceiver unit or the redundant router transceiver unit to communicate the network data over the cable bus if the other of the first router transceiver unit or the redundant router transceiver unit enters a failure condition for being unable to communicate the network data over the cable bus.

In another aspect, each of the first router transceiver unit and the redundant router transceiver unit is configured to be coupled to a cable bus of the same vehicle for communicating network data over the cable bus. The first router transceiver unit is configured to switch over for the redundant router transceiver unit to communicate the network data over the cable bus if the first router transceiver unit enters a failure condition for being unable to communicate the network data over the cable bus.

In another aspect, the cable bus is an existing cable of a vehicle consist having a plurality of the vehicles. The first router transceiver unit and the redundant router transceiver unit are configured to be coupled to the cable bus to communicate the network data between the vehicles of the vehicle consist.

In another aspect, the first router transceiver unit and the redundant router transceiver unit are configured to communicate the network data over the cable bus in different network groups.

In another aspect, the first router transceiver unit and the redundant router transceiver unit are configured to communicate the network data over the cable bus in a common network group.

In another aspect, the first router transceiver unit and the redundant router transceiver unit are configured to be coupled to a common portion of the cable bus to communicate the network data.

In another aspect, the first router transceiver unit and the redundant router transceiver unit are configured to be coupled to different, distinct portions of the cable bus to communicate the network data.

In another embodiment, another communication system is provided. The system includes a first router transceiver unit that is configured to be coupled to a cable bus of a first vehicle for communicating network data over the cable bus. The cable bus is configured to interconnect the first vehicle with an adjacent second vehicle when the first vehicle and the second vehicle are assembled together in a vehicle consist. The first router transceiver unit is configured to switch to a redundant router transceiver unit on the vehicle, for the redundant router transceiver unit to communicate the network data over the cable bus, when the first router transceiver unit enters a failure condition for being unable to communicate the network data over the cable bus.

In another aspect, the first router transceiver unit is configured to communicate the network data over the cable bus in a first network group that differs from a second network group of the redundant router transceiver unit.

In another aspect, the first router transceiver unit is configured to communicate the network data over the cable bus in a common network group with the redundant router transceiver unit.

In another aspect, the first router transceiver unit is configured to communicate the network data over a common portion of the cable bus as the redundant router transceiver unit.

In another aspect, the first router transceiver unit is configured to communicate the network data over a first portion of the cable bus that is distinct from a second portion of the cable bus used by the redundant route transceiver unit to communicate the network data.

In another embodiment, another communication system for communicating data in a vehicle consist is provided. The system includes a first router transceiver pair and a redundant router transceiver pair. The first router transceiver pair includes a first router transceiver unit positioned in a first vehicle of the vehicle consist and a second router transceiver unit positioned in a second vehicle of the vehicle consist. Each vehicle within the vehicle consist is interconnected with one or more other vehicles in the vehicle consist. The redundant router transceiver pair includes a third router transceiver unit positioned in the first vehicle and a fourth router transceiver unit positioned in the second vehicle. The first router transceiver unit and the third router transceiver unit form a first transceiver set in the first vehicle. The second router transceiver unit and the fourth router transceiver unit form a second transceiver set in the second vehicle. Each of the first, second, third, and fourth router transceiver units is coupled to a vehicle multiple unit (MU) cable bus in the vehicle consist that interconnects the first and second vehicles. The MU cable bus is an existing cable bus used in the vehicle consist for transferring non-network control information between the vehicles within the vehicle consist. Each of the first, second, third, and fourth router transceiver units is configured to communicate network data between the first vehicle and the second vehicle over the MU cable bus. If either of the first router transceiver pair or the redundant router transceiver pair enters a failure condition for being unable to communicate the network data over the MU cable bus between the first vehicle and the second vehicle, then the other of the first router transceiver pair or the redundant router transceiver pair communicates the network data between the first vehicle and the second vehicle over the MU cable bus.

In another aspect, the first router transceiver pair is configured in a first network group and the redundant router transceiver pair is configured in a second, different network group.

In another aspect, the MU cable bus comprises a plurality of conductive pathways that are not conductively coupled with each other within the MU cable bus. The first router transceiver unit and the second router transceiver unit of the first router transceiver pair are conductively coupled with each other by a first subset of the conductive pathways. The third router transceiver unit and the fourth router transceiver unit of the redundant router transceiver pair are conductively coupled with each other by a distinct, second subset of the conductive pathways.

In another aspect, the MU cable bus comprises a plurality of conductive pathways that are not conductively coupled with each other within the MU cable bus. A common portion of the conductive pathways conductively couples the first router transceiver unit with the second router transceiver unit of the first router transceiver pair and the third router transceiver unit with the fourth router transceiver unit of the redundant router transceiver pair.

In another aspect, the first router transceiver pair and the second router transceiver pair are communicatively coupled in the same network group.

In another aspect, the MU cable bus comprises a plurality of conductive pathways that are not conductively coupled with each other within the MU cable bus. The first router transceiver unit and the second router transceiver unit of the first router transceiver pair are conductively coupled with each other by a first subset of the conductive pathways. The third router transceiver unit and the fourth router transceiver unit of the redundant router transceiver pair are conductively coupled with each other by a distinct, second subset of the conductive pathways.

In another aspect, the MU cable bus comprises a plurality of conductive pathways that are not conductively coupled with each other within the MU cable bus. A common portion of the conductive pathways conductively couples the first router transceiver unit with the second router transceiver unit of the first router transceiver pair and the third router transceiver unit with the fourth router transceiver unit of the redundant router transceiver pair.

In another aspect, the first router transceiver unit and the second router transceiver unit of the first router transceiver pair communicate with each other over the MU cable bus using a first communication channel. The third and fourth router transceiver units of the second router transceiver pair communicate with each other over the MU cable bus using a second, different communication channel.

In another aspect, the first communication channel includes a first subset of frequencies in a spectrum of frequencies used to communicate over the MU cable bus and the second communication channel includes a different, second subset of frequencies in the spectrum.

In another aspect, the system also includes at least one of a first shared power supply conductive pathway or a second shared power supply conductive pathway. The first shared power supply conductive pathway delivers electrical energy from a first power supply to the first transceiver set in the first vehicle. The second shared power supply conductive pathway delivers electrical energy from a second power supply to the second transceiver set in the second vehicle.

In another aspect, the system also includes monitor module that is communicatively coupled with at least one of the first transceiver set in the first vehicle or the second transceiver set in the second vehicle. The monitor module is configured to determine when either of the first router transceiver pair or the redundant router transceiver pair enters the failure condition and to direct the other of the first router transceiver pair or the redundant router transceiver pair to control future data transmissions over the MU cable bus.

In another embodiment, a method for communicating data in a vehicle consist is provided. The method includes providing a first transceiver pair including a first router transceiver unit positioned in a first vehicle of the vehicle consist and a second router transceiver unit positioned in a second vehicle of the vehicle consist. Each vehicle within the vehicle consist is mechanically interconnected with one or more other vehicles in the vehicle consist. The method also includes providing a redundant router transceiver pair including a third router transceiver unit positioned in the first vehicle and a fourth router transceiver unit positioned in the second vehicle. The first router transceiver unit and the third router transceiver unit form a first transceiver set in the first vehicle and the second router transceiver unit and the fourth router transceiver unit form a second transceiver set in the second vehicle. The method further includes coupling each of the first, second, third, and fourth router transceiver units to a vehicle multiple unit (MU) cable bus in the vehicle consist that interconnects the first and second vehicles. The MU cable bus is an existing cable bus used in the vehicle consist for transferring non-network control information between the vehicles within the vehicle consist. Each of the first, second, third, and fourth router transceiver units is configured to communicate network data between the first vehicle and the second vehicle over the MU cable bus. If either of the first router transceiver pair or the redundant router transceiver pair enters a failure condition for being unable to communicate the network data over the MU cable bus between the first vehicle and the second vehicle, then the other of the first router transceiver pair or the redundant router transceiver pair communicates the network data between the first vehicle and the second vehicle over the MU cable bus.

In another aspect, the first router transceiver pair is configured in a first network group, the redundant router transceiver pair is configured in a second, different network group, and the MU cable bus comprises a plurality of conductive pathways that are not conductively coupled with each other within the MU cable bus. The coupling step can include coupling first router transceiver unit and the second router transceiver unit of the first router transceiver pair with each other by a first subset of the conductive pathways. The third router transceiver unit and the fourth router transceiver unit of the redundant router transceiver pair are conductively coupled with each other by a distinct, second subset of the conductive pathways.

In another aspect, the first router transceiver pair is configured in a first network group, the redundant router transceiver pair is configured in a second, different network group, and the MU cable bus comprises a plurality of conductive pathways that are not conductively coupled with each other within the MU cable bus. The coupling step can include coupling the first router transceiver unit with the second router transceiver unit of the first router transceiver pair and the third router transceiver unit with the fourth router transceiver unit of the redundant router transceiver pair using a common portion of the conductive pathways.

In another aspect, the first router transceiver pair and the second router transceiver pair are communicatively coupled in the same network group, and the MU cable bus comprises a plurality of conductive pathways that are not conductively coupled with each other within the MU cable bus. The coupling step can include coupling first router transceiver unit and the second router transceiver unit of the first router transceiver pair with each other by a first subset of the conductive pathways, and the third router transceiver unit and the fourth router transceiver unit of the redundant router transceiver pair conductively coupled with each other by a distinct, second subset of the conductive pathways.

In another aspect, the first router transceiver pair and the second router transceiver pair are communicatively coupled in the same network group, and the MU cable bus comprises a plurality of conductive pathways that are not conductively coupled with each other within the MU cable bus. The coupling step can include coupling the first router transceiver unit with the second router transceiver unit of the first router transceiver pair and the third router transceiver unit with the fourth router transceiver unit of the redundant router transceiver pair using a common portion of the conductive pathways.

In another embodiment, a communication system for communicating data in a vehicle consist is provided. The system includes a first transceiver set and a second transceiver set. The first transceiver set comprises a first router transceiver unit and a third router transceiver unit disposed in first vehicle of a vehicle consist formed of a plurality of interconnected vehicles. The first router transceiver unit and the third router transceiver unit are conductively coupled with a vehicle multiple unit (MU) cable bus that couples the vehicles in the vehicle consist. The MU cable bus transfers non-network vehicle control information between the vehicles in the vehicle consist. The second transceiver set comprises a second router transceiver unit and a fourth router transceiver unit disposed in a second vehicle of the vehicle consist. The second router transceiver unit and the fourth router transceiver unit conductively are coupled with the MU cable bus. The first router transceiver unit and the second router transceiver unit form a first router transceiver pair. The third router transceiver unit and the fourth router transceiver unit form a redundant router transceiver pair. The first router transceiver pair communicates network data over the MU cable bus until one or more of the first router transceiver unit or the second router transceiver unit enters a failure condition. The redundant transceiver pair takes over communication of the network data over the MU cable bus upon occurrence of the failure condition.

In another aspect, the first router transceiver pair and the second router transceiver pair are configured to concurrently communicate the network data over the MU cable bus prior to the failure condition.

In another aspect, the first router transceiver pair is associated with a first network group and the second router transceiver pair is associated with a second network group. The first network group communicates the network data over the MU cable bus separate from the second network group.

In another aspect, the first router transceiver pair communicates the network data over the MU cable bus using a first channel and the second router transceiver pair communicates the network data over the MU cable bus using a different, second channel.

In another embodiment, a communication system for communicating data in a vehicle consist is provided. The system includes a first router transceiver pair and a redundant router transceiver pair. The first router transceiver pair comprises a first router transceiver unit positioned in a first vehicle of the vehicle consist and a second router transceiver unit positioned in a second vehicle of the vehicle consist. Each vehicle within the vehicle consist is interconnected with one or more other vehicles in the vehicle consist. The redundant router transceiver pair comprises a third router transceiver unit positioned in the first vehicle and a fourth router transceiver unit positioned in the second vehicle. Each of the first, second, third, and fourth router transceiver units is coupled to a cable bus in the vehicle consist that interconnects the first and second vehicles. Each of the first, second, third, and fourth router transceiver units is configured to communicate network data between the first vehicle and the second vehicle over the cable bus. If either of the first router transceiver pair or the redundant router transceiver pair enters a failure condition for being unable to communicate the network data over the cable bus between the first vehicle and the second vehicle, then the other of the first router transceiver pair or the redundant router transceiver pair communicates the network data between the first vehicle and the second vehicle over the cable bus.

In another aspect, the cable bus is used in the vehicle consist for transferring non-network control information between the vehicles within the vehicle consist.

In another aspect, the cable bus is an MU cable bus and the vehicle consist is a locomotive consist.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to one of ordinary skill in the art upon reviewing the above description. The scope of the invention should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle consist, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A communication system for a vehicle consist, comprising:
   a control module configured to interface with at least one of a first router transceiver pair or a redundant router transceiver pair, each router transceiver pair configured to communicate network data between vehicles of the consist over a cable bus of the vehicle consist, wherein the control module includes:
   a monitor module for monitoring operation of at least one of the first router transceiver pair or the redundant router transceiver pair; and
   a switch module operably coupled with the monitor module, the switch module being configured to control the first router transceiver pair or the redundant router transceiver pair to communicate the network data over the cable bus if the other of the first router transceiver pair or the redundant router transceiver pair enters a failure condition for being unable to communicate the network data over the cable bus, as determined by the monitor module.

2. The system of claim 1, wherein the control module controls the first router transceiver pair to communicate the network data in a first network group and the redundant router transceiver pair to communicate the network data in a different, second network group.

3. The system of claim 2, wherein the cable bus comprises a plurality of conductive pathways that are not conductively coupled with each other within the cable bus, and the control module directs the first router transceiver pair to communicate the network data over a first subset of the conductive pathways and the redundant router transceiver pair to communicate the network data over a distinct, second subset of the conductive pathways.

4. The system of claim 2, wherein the cable bus comprises a plurality of conductive pathways that are not conductively coupled with each other within the cable bus, and the control module directs the first router transceiver pair and the redundant router transceiver pair to communicate the network data over a common portion of the conductive pathways.

5. The system of claim 1, wherein the control module controls the first router transceiver pair to communicate the network data in a first network group and the redundant router transceiver pair to communicate the network data in the same first network group.

6. The system of claim 5, wherein the cable bus comprises a plurality of conductive pathways that are not conductively coupled with each other within the cable bus, and the control module directs the first router transceiver pair to communicate the network data over a first subset of the conductive pathways and the redundant router transceiver pair to communicate the network data over a distinct, second subset of the conductive pathways.

7. The system of claim 5, wherein the cable bus comprises a plurality of conductive pathways that are not conductively coupled with each other within the cable bus, and the control module directs the first router transceiver pair and the redundant router transceiver pair to communicate the network data over a common portion of the conductive pathways.

8. The system of claim 1, wherein the control module directs the first router transceiver pair to communicate the network data using a first communication channel and the redundant router transceiver pair to communicate the network data using a second, different communication channel.

9. The system of claim 1, wherein the first router transceiver pair includes a first router transceiver unit in a first vehicle and a second router transceiver unit in a different, second vehicle, and the redundant router transceiver pair includes a third router transceiver unit in the first vehicle and a fourth router transceiver unit in the second vehicle, and further comprising a shared power supply conductive pathway delivering electrical energy from a power supply to the first router transceiver unit and the third router transceiver unit in the first vehicle.

10. A communication method comprising:
   monitoring a first router transceiver pair and a redundant router transceiver pair, the first router transceiver pair including a first router transceiver unit disposed on a first vehicle of a vehicle consist and a second router transceiver unit disposed on a different, second vehicle of the vehicle consist, the redundant router transceiver pair including a third router transceiver unit disposed on the first vehicle and a fourth router transceiver unit disposed on the second vehicle, the first router transceiver pair and the redundant router transceiver pair configured to communicate network data over a cable bus that extends through the vehicle consist;

determining that one of the first router transceiver pair or the redundant router transceiver pair has entered a failure condition for being unable to communicate the network data over the cable bus; and subsequent said determination, controlling the other of the first router transceiver pair or the redundant router transceiver pair to communicate the network data over the cable bus.

11. The method of claim 10, wherein the monitoring step includes monitoring communication of the network data by at least one of the first router transceiver pair or the redundant router transceiver pair over a common portion of the cable bus.

12. The method of claim 10, wherein the monitoring step includes monitoring communication of the network data by the first router transceiver pair over a first portion of the cable bus and monitoring communication of the network data by the redundant router transceiver pair over a distinct, second portion of the cable bus.

13. The method of claim 10, wherein the monitoring step includes monitoring communication of the network data in a first network group of the first router transceiver pair and monitoring communication of the network data in a different, second network group of the redundant router transceiver pair.

14. The method of claim 10, wherein the monitoring step includes monitoring communication of the network data in a network group of the first router transceiver pair and monitoring communication of the network data in the same network group of the redundant router transceiver pair.

15. A communication system comprising:
a first router transceiver unit; and
a redundant router transceiver unit;
wherein each of the first router transceiver unit and the redundant router transceiver unit is configured to be coupled to a cable bus of a vehicle for communicating network data over the cable bus; and
wherein each of the first router transceiver unit and the redundant router transceiver unit is configured for one of the first router transceiver unit or the redundant router transceiver unit to communicate the network data over the cable bus if the other of the first router transceiver unit or the redundant router transceiver unit enters a failure condition for being unable to communicate the network data over the cable bus.

16. The system of claim 15, wherein each of the first router transceiver unit and the redundant router transceiver unit is configured to be coupled to a cable bus of the same vehicle for communicating network data over the cable bus, and the first router transceiver unit is configured to switch over for the redundant router transceiver unit to communicate the network data over the cable bus if the first router transceiver unit enters a failure condition for being unable to communicate the network data over the cable bus.

17. The system of claim 15, wherein the cable bus is an existing cable of a vehicle consist having a plurality of the vehicles, and the first router transceiver unit and the redundant router transceiver unit are configured to be coupled to the cable bus to communicate the network data between the vehicles of the vehicle consist.

18. The system of claim 15, wherein the first router transceiver unit and the redundant router transceiver unit are configured to communicate the network data over the cable bus in different network groups.

19. The system of claim 15, wherein the first router transceiver unit and the redundant router transceiver unit are configured to communicate the network data over the cable bus in a common network group.

20. The system of claim 15, wherein the first router transceiver unit and the redundant router transceiver unit are configured to be coupled to a common portion of the cable bus to communicate the network data.

21. The system of claim 15, wherein the first router transceiver unit and the redundant router transceiver unit are configured to be coupled to different, distinct portions of the cable bus to communicate the network data.

22. A communication system comprising:
a first router transceiver unit configured to be coupled to a cable bus of a first vehicle for communicating network data over the cable bus, wherein the cable bus is configured to interconnect the first vehicle with an adjacent second vehicle when the first vehicle and the second vehicle are assembled together in a vehicle consist;
wherein the first router transceiver unit is configured to switch to a redundant router transceiver unit on the first vehicle, for the redundant router transceiver unit to communicate the network data over the cable bus, when the first router transceiver unit enters a failure condition for being unable to communicate the network data over the cable bus.

23. The system of claim 22, wherein the first router transceiver unit is configured to communicate the network data over the cable bus in a first network group that differs from a second network group of the redundant router transceiver unit.

24. The system of claim 22, wherein the first router transceiver unit is configured to communicate the network data over the cable bus in a common network group with the redundant router transceiver unit.

25. The system of claim 22, wherein the first router transceiver unit is configured to communicate the network data over a common portion of the cable bus as the redundant router transceiver unit.

26. The system of claim 22, wherein the first router transceiver unit is configured to communicate the network data over a first portion of the cable bus that is distinct from a second portion of the cable bus used by the redundant router transceiver unit to communicate the network data.

27. A communication system for communicating data in a vehicle consist, the system comprising:
a first router transceiver pair comprising a first router transceiver unit positioned in a first vehicle of the vehicle consist and a second router transceiver unit positioned in a second vehicle of the vehicle consist, wherein each vehicle within the vehicle consist is interconnected with one or more other vehicles in the vehicle consist; and
a redundant router transceiver pair comprising a third router transceiver unit positioned in the first vehicle and a fourth router transceiver unit positioned in the second vehicle;
wherein each of the first, second, third, and fourth router transceiver units is coupled to a cable bus in the vehicle consist that interconnects the first and second vehicles;
wherein each of the first, second, third, and fourth router transceiver units is configured to communicate network data between the first vehicle and the second vehicle over the cable bus; and
wherein if either of the first router transceiver pair or the redundant router transceiver pair enters a failure condition for being unable to communicate the network data over the cable bus between the first vehicle and the second vehicle, then the other of the first router transceiver pair or the redundant router transceiver pair communicates the network data between the first vehicle and the second vehicle over the cable bus.

28. The system of claim 27, wherein the cable bus is used in the vehicle consist for transferring non-network control information between the vehicles within the vehicle consist.

29. The system of claim 28, wherein the cable bus is a multiple unit (MU) cable bus and the vehicle consist is a locomotive consist.

* * * * *